(12) United States Patent
Pretorius et al.

(10) Patent No.: US 10,402,601 B2
(45) Date of Patent: Sep. 3, 2019

(54) ANTENNA

(71) Applicant: Licensys Australasia Pty. Ltd., Sumner, Queensland (AU)

(72) Inventors: Albertus Jacobus Pretorius, Karalee (AU); Abraham Gert Willem du Plooy, Mt. Barker (AU); Ahmed Toaha Mobashsher, St. Lucia (AU)

(73) Assignee: Licensys Australasia Pty., Sumner, Queensland (AU)

( * ) Notice: Subject to any disclaimer, the term of this patent is extended or adjusted under 35 U.S.C. 154(b) by 0 days.

(21) Appl. No.: 15/841,350

(22) Filed: Dec. 14, 2017

(65) Prior Publication Data
US 2018/0173908 A1 Jun. 21, 2018

(30) Foreign Application Priority Data

Dec. 20, 2016 (AU) ................. 2016905266

(51) Int. Cl.
*G06K 7/08* (2006.01)
*G06K 7/10* (2006.01)
(Continued)

(52) U.S. Cl.
CPC ..... *G06K 7/10316* (2013.01); *G06K 7/10158* (2013.01); *H01Q 1/2216* (2013.01);
(Continued)

(58) Field of Classification Search
CPC ......... G06K 19/0723; G06K 19/07749; G06K 19/07773; G06K 19/07786; G06K 7/0008;
(Continued)

(56) References Cited

U.S. PATENT DOCUMENTS

| 2,791,769 A | 5/1957 | Lindenblad |
| 3,810,183 A | 5/1974 | Krutsinger et al. |
| | (Continued) | |

FOREIGN PATENT DOCUMENTS

| AU | 2016101994 | 12/2016 |
| EP | 1998403 | 12/2008 |
| | (Continued) | |

OTHER PUBLICATIONS

Office Communication/Search Report from European Application No. 17207142.5 dated Apr. 25, 2018.

*Primary Examiner* — Thien M Le
(74) *Attorney, Agent, or Firm* — Calfee, Halter & Griswold LLP

(57) ABSTRACT

An antenna for a communication device, and also an RFID reader incorporating the antenna, are disclosed. The antenna has a structure including a ground portion and a radiating component. The radiating component has a first side, and a second side that is spaced apart from the first side. The first side has a ground edge portion which is in contact with the ground portion, and the first side extends, from its ground edge portion, away from a surface on one side of the ground portion. The second side also has a ground edge portion which is in contact with the ground portion, and the second side also extends, from its ground edge portion, away from a surface on said one side of the ground portion.

16 Claims, 8 Drawing Sheets

(51) Int. Cl.
*H01Q 1/48* (2006.01)
*H01Q 9/04* (2006.01)
*H01Q 1/22* (2006.01)
*H01Q 13/10* (2006.01)
*H01Q 1/32* (2006.01)
*H01Q 13/18* (2006.01)
*H01Q 25/00* (2006.01)

(52) U.S. Cl.
CPC ............. *H01Q 1/3225* (2013.01); *H01Q 1/48* (2013.01); *H01Q 9/0421* (2013.01); *H01Q 13/10* (2013.01); *H01Q 13/18* (2013.01); *H01Q 25/004* (2013.01)

(58) Field of Classification Search
CPC .. G06K 7/10316; H01Q 9/0421; H01Q 1/243; H01Q 13/10; H01Q 1/2208; H01Q 1/2216; H01Q 1/2225
USPC ........................................................ 235/451
See application file for complete search history.

(56) References Cited

U.S. PATENT DOCUMENTS

| | | |
|---|---|---|
| 4,242,685 A | 12/1980 | Sanford |
| 4,658,261 A | 4/1987 | Reid et al. |
| 5,541,612 A | 7/1996 | Josefsson |
| 5,638,079 A | 6/1997 | Kastner et al. |
| 5,717,410 A | 2/1998 | Ohmine et al. |
| 2002/0047805 A1 | 4/2002 | Yamamoto |
| 2004/0041733 A1* | 3/2004 | Milosavljevic ........ H01Q 1/243 343/700 MS |
| 2004/0058723 A1* | 3/2004 | Mikkola ................. H01Q 1/243 455/575.7 |
| 2006/0284778 A1 | 12/2006 | Sanford et al. |
| 2007/0195003 A1* | 8/2007 | Deavours ......... G06K 19/07749 343/860 |
| 2008/0309567 A1* | 12/2008 | Sabet ................... H01Q 1/2241 343/745 |
| 2010/0090802 A1* | 4/2010 | Nilsson ................. G01N 17/04 340/10.1 |
| 2011/0279232 A1* | 11/2011 | Tuttle ................ G06K 19/0723 340/10.1 |
| 2014/0266920 A1* | 9/2014 | Tran ....................... H01Q 1/243 343/702 |

FOREIGN PATENT DOCUMENTS

| | | |
|---|---|---|
| EP | 2830157 | 1/2015 |
| WO | 2012/159618 | 11/2012 |
| WO | 2015/157814 | 10/2015 |
| WO | 2016/008004 | 1/2016 |

\* cited by examiner

ANTENNA

CROSS REFERENCE TO RELATED APPLICATIONS

This application claims the priority to and the benefit of Australian Application No. 2016905266, filed on Dec. 20, 2016, which is incorporated herein by reference in its entirety.

TECHNICAL FIELD

The present invention involves, among other things, an antenna with particular design and performance characteristics.

In some particular (albeit non-limiting) example applications, the antenna may be placed on the road or ground surface in, say, a vehicle parking lot or other vehicle parking area or space, or on the road or ground surface of a gated driveway or road, or indeed on the road or ground surface in a range of other locations where vehicles may be (or may become) positioned or stationary, or where vehicles may travel at low speeds, and where there is a need or advantage in being able to detect and/or identify vehicles. The antenna may be used in performing radio-frequency identification (RFID) with RFID capable tags (RFID tags) which are located on (e.g. on the front and/or the back of) vehicles. In such applications, the antenna may be a part of (or associated with) a RFID reader which is operable to communicate with the RFID tags. Preferably, the RFID tags will be located on the vehicles' license plates. (Or more specifically, for vehicles which have a license plate on the front and the rear, a RFID tag will preferably be included on or in one or both of a said vehicle's license plates, or for vehicles which have only one license plate, a RFID tag will preferably be placed on or in the single license plate).

Notwithstanding the foregoing, it is to be clearly understood that no particular limitations are to be implied from any of the example applications or uses mentioned above or discussed below. Thus, the antenna could potentially be used in a wide range of other areas and/or applications as well. By way of example, rather than being used in "on-road" applications for detecting RFID tags on vehicles (or on the vehicles' license plate(s)), the antenna could instead potentially find use in, say, logistics applications, for example, in on-road/on-ground applications for detecting and/or identifying RFID-tag-bearing shipping containers at specific placement locations on the ground in container storage yards, or the like. The antenna might even be used in on-ground or on-floor applications in areas where people or personnel walk or move around, for monitoring movement of people or personnel (who may be e.g. carrying RFID tag bearing cards or the like at their waist or in a pocket etc) in or through and/or restricting their access to different areas, etc.

Nevertheless, for convenience, the invention will hereafter be described with reference to, and in the context of, the above referenced kinds of vehicle parking or gating (or other like vehicle presence or access control) applications where the antenna communicates with RFID tags which are located on vehicle license plates.

BACKGROUND

For the purpose of providing a background and introduction to the present invention, reference is hereby made to the following earlier patent applications, namely:

International Patent Application No. PCT/AU2015/050161 (hereinafter referred to as "patent application '161");

International Patent Application No. PCT/AU2015/050384 (hereinafter referred to as "patent application '384"); and Australian Innovation Patent Application No. 2016101994 (hereinafter referred to as "patent application '994").

The entire contents of the earlier patent applications listed above are hereby incorporated herein by reference. However, in the event of (or to the extent of) any inconsistency or discrepancy between the disclosure in the present specification and the disclosure in any of the earlier patent applications listed above, the present specification takes precedence and overrides. Also, the mere incorporation herein of the contents of the earlier patent applications listed above does not mean that any express or implied restrictions or limitations on any inventions disclosed in any of those earlier patent applications, or that any express or implied restrictions or limitations on any other disclosure(s) given therein, necessarily also apply to the present invention or the disclosures herein.

In the context of road vehicle detection and identification through RFID, patent applications '161 and '384 in particular explain, inter alia, that there are a number of significant benefits and advantages that can arise from placing an RFID tag fairly low-down on a vehicle (i.e. quite close to ground/road height), preferably by placing a tag on one or both of the vehicle's license plates (or by embedding a tag in one or both of the vehicle's license plates thereby making the license plates "smart" plates), and also from enabling the said RFID tag(s) to be read by an RFID reader, the antenna of which (at least) is placed on or in the road. Many reasons for this are explained in detail in patent applications '161 and '384.

It is to be noted that the proposal in the previous paragraph, namely placing RFID tags low on vehicles (preferably by having the tags on or embedded in license plates) and enabling the tags to be read by an RFID reader which has (at least) its antenna placed on or in the road, represents a major departure from the design and thinking behind conventional RFID systems used for vehicle detection, identification and/or monitoring. Indeed, in most conventional RFID-based vehicle detection, identification and/or monitoring systems, an RFID tag is installed on the inside of a vehicle's windscreens (i.e. quite high up on the vehicle), and the RFID tags on the vehicles are read by RFID readers mounted (very often) "overhead", generally on over-road gantries or the like. These conventional systems incorporating windscreen-mounted RFID tags and over-road or gantry based RFID reader placements suffer from numerous disadvantages, as discussed more in patent applications '161 and '384. However, of the many disadvantages, one of the most significant is quite simply the cost associated with over-road gantries, both in terms of the cost of producing the gantries themselves (they are large metal structures), and also in terms of costs associated with erection of the gantries over the roads, and the installation of the RFID reader equipment thereon, etc, as well as any subsequent maintenance or repair of the gantry and/or reader equipment, all of which generally require partial or complete closure of the road (which is in turn extremely disruptive and expensive in itself, quite apart from the actual costs associated with the maintenance or repair).

Patent applications '384 and '994 describe the design and configuration of certain antennas, and RFID readers incorporating said antennas, that may be capable of on-road or in-road installation or deployment and which may also be suitable (when installed/deployed on or in the road) for reading RFID tags on passing vehicles' license plates, including on freeways or other roads with high (or potentially high) vehicle speeds. The antennas and RFID readers described in patent applications '384 and '994, and other associated disclosures therein, therefore provide a possible alternative to conventional RFID systems in freeway and open road scenarios which rely on over-road gantries and the like. Use of the antennas described in patent applications '384 and '994 may therefore allow a number of the major disadvantages associated with over-road gantries or the like, including (in particular) the cost thereof, to be avoided or reduced, whilst still allowing vehicle detection and identification, etc, using RFID.

For the purposes of the present introduction, it is to be noted that, where an antenna is installed/deployed on or in the road and is to be used for reading RFID tags on passing vehicles' license plates, particularly on freeways or other roads with high (or potentially high) vehicle speeds (and it is believed that the antennas described in patent application '384 and/or '994 are suitable/capable of use in these kinds of high-speed applications), there is a required read zone for the antenna which is actually quite specifically defined in terms of its size and shape. In other words, there is a region of quite specific size and shape near the RFID reader antenna inside which the RFID reader is required to be (i.e. it must be) able to communicate with a vehicle's plate-mounted RFID tag if (or whenever) a vehicle's tag is within the said region. The reason this required read zone (region) is quite specifically defined in terms of its size and shape is due to a number of factors, including: the geometry associated with the placement location and orientation of license plates on vehicles, the dimensions (especially the width) of road lanes, the typical maximum speed of travel of vehicles (especially on freeways and other high (or potentially high) speed roads), and the time required for an RFID reader to reliably "read" (i.e. detect and positively identify) a vehicle's (plate-mounted) RFID tag. This is all explained in much greater detail in patent applications '384 and '994.

Also, for the purposes of the present introduction, it should be noted that, for "open road" and freeway applications especially (where vehicle speeds may be high), there is also generally a need to be able to detect and identify a vehicle which could potentially be at any location within a road lane, including perhaps even at a position across or straddling multiple lanes if the road has more than one lane. What this means is that, in these kinds of "open road" and freeway applications, there is (or there may often be) a need to be able to detect and positively identify passing vehicles notwithstanding the fact there is often considerable uncertainty as to the actual location of a vehicle (i.e. where the vehicle will actually be relative to the antenna) as the vehicle passes the antenna. There may also be a need to be able to detect vehicles moving in different directions relative to the antenna, for example, if the antenna is placed at a crossroads or at an intersection where different vehicles may pass over or pass by the antenna while travelling in different directions. As a result of these things, RFID reader antennas which are capable of on- and/or in-road placement and which are suitable for reading RFID tags on passing vehicles' license plates on freeways or in other open road applications should generally have (or at least it is desirable for them to have) a radiation pattern that "points" in most, if not all, radial directions around the antenna. In other words, the antenna's radiated energy must (at least preferably) propagate in all radial directions, preferably approximately or substantially equally in all radial directions. Thus, for freeway and other open road applications especially, the antenna should preferably be (at least substantially) non-directional (or omni-directional). In addition, the amount of energy radiated in an "upward" direction (i.e. the amount of energy directed vertically upwards perpendicular to the surface of the road) should be limited. There are a number of reasons for this, including limiting potentially "blinding" energy reflections from the undersides of vehicles that pass over the top of the antenna.

Designing an antenna which is able to provide a radiation pattern that meets or balances the above-summarised requirements has proven to be extremely challenging, although the antenna designs described in patent applications '384 and '994 are presently considered to be promising, and one or more of them are thought to be commercially viable, including for "open road" and freeway applications.

As mentioned above, in open road and freeway scenarios (and hence at locations where vehicles are to be detected and positively identified in these scenarios), vehicles are generally (or they can be) moving at high speed. As an indication (albeit without limitation), for design purposes, an assumption is often made that on freeways and open roads, vehicles may be travelling up to (or around) 180 km/h, or at least at speeds of this order. In any case, as a result of the potentially high vehicle speeds on freeways and other open roads, it is often the case that a vehicle that is passing an RFID antenna on a freeway or open road, and whose plate-mounted RFID tag must be read by the RFID reader associated with the antenna, will only be in the antenna's "read zone" for a very short period of time (due to the speed at which the vehicle moves past the stationary antenna). As a result of this, in these kinds of high vehicle speed scenarios, there is sometimes a need (or perhaps a desire) to supply a high amount of power to the on- or in-road antenna (to the extent possible or permitted by regulation). This is to try and increase or maximise the size of the antenna's "read zone", because if the size of the "read zone" near the RFID antenna is increased, then the amount of time that the vehicle is within that "read zone" as it passes the antenna will also likely increase, thus giving more time for the RFID reader to detect and positively identify the vehicle through communication with the RFID tag on (at least one of) the vehicle's license plates. However, simply increasing the power supplied to the RFID reader antenna in order to increase the size of the antenna's "read zone" (for the purpose of providing a greater amount of time to perform RFID communication with vehicles' plate mounted RFID tags) is not always viable, or even permitted. For one thing, there may be limits on the amount of power that can be supplied to the antenna, e.g. due to limits on the power that can be easily transmitted to the antenna's on- or in-road location, or perhaps due to limits on the amount of power a battery can supply if it is to have a life or re-charge interval that is not too short, etc. Also, in many jurisdictions there are laws or regulations which place restrictions on the amount of power that a radio antenna (including an RFID antenna intended for vehicle detection/identification use) may emit. These things, for example, therefore often place restrictions on the amount of power that may be supplied to the on- or in-road antenna. However, even aside from the above, there are also practical reasons why increasing the power supplied to an RFID antenna, particularly one that is located on or in the road and used for vehicle detection and identification, is undesirable. For example, it was mentioned above that the amount of energy radiated in an "upward" direction from an on- or in-road antenna (i.e. the amount of energy directed vertically upwards perpendicular to the surface of the road) should be limited, largely so as to limit "blinding" reflections from the underside of the vehicles. Simply increasing the amount of power supplied to an on- or in-road RFID antenna used for vehicle detection/identification would not only increase the size of antenna's "read zone" in a radial direction (parallel to the ground), but it would also increase the strength (or power or power density) of the radiation pattern (i.e. increase the amount of radiated power) that is directed in the vertically upward direction (perpendicular to the ground), which would be counter-productive because it would increase the potential for undesirable "blinding" reflections from the undersides of vehicles (among other things). Furthermore, increasing the amount of power that is supplied to an RFID antenna would also likely increase the amount of heat that is generated, not only by the antenna itself, but also (and often much more so) by the associated RFID reader equipment which supplies the power to the antenna (among other things). The amount of heat generated by the antenna and associated RFID reader equipment is extremely important, especially in scenarios where an RFID reader is installed "in-road" because, due to the location and environment in these installations scenarios, there is often very limited possibility for ventilation or other means of heat dissipation. Consequently, minimising the amount of heat that is generated by the antenna and any associated RFID reader (or other) electronics in the first place becomes very important, because the difficulty in ventilating or dissipating heat means that if too much heat is generated in the first place then there may be a danger of overheating the antenna and/or electronics (which may in turn lead to damage or overheating prevention shutdown, if not actual overheating or damage).

Another strategy or design technique used to help in accommodating (or allowing detection and identification of) vehicles travelling at high speeds on freeways or in other open road scenarios—and this is applicable e.g. to the proposals in patent applications '384 and '994—is for the antenna and associated RFID reader equipment to operate with quite a high (or even very high) duty cycle. What operating with a high duty cycle means, in simple terms, is that the RFID reader electronics associated with the antenna cause the antenna to be "powered on", hence causing the antenna to be radiating radio frequency energy, for a high proportion of the time, or more accurately, for or a high proportion of each signal period. The reason why a high (or very high) duty cycle is often used is, again, to maximise the chance of detecting and reading a vehicle's RFID tag during the potentially short time period while the tag remains in the antenna's read zone. As explained above, this time period is potentially short due to the high speed at which vehicles may be moving in highway scenarios and the consequently limited period of time available to read the tag. However, one of the consequences of using a high duty cycle is that the amount of energy consumed is increased. Basically, the higher the duty cycle, the higher is the energy use and consumption by the RFID reader antenna and it's electronics. Also, it generally follows that the higher the energy use and consumption (in this case due to the use of a high duty cycle) the higher the potential for heat generation.

Designing an RFID reader whose antenna is able to provide a radiation pattern that meets or balances the requirements discussed above, and also where the RFID reader is able to operate with a high duty cycle whilst at the same time ensuring energy use and consumption and heat generation do not exceed acceptable levels, has proven to be extremely challenging. Even so, again, the antenna and RFID reader design(s) described in patent application '994 in particular is presently considered to be promising, and (it is thought) commercially viable, including for "open road" and freeway applications.

However, yet another issue to consider for RFID readers like e.g. the one described in patent application '994, including its antenna and the associated RFID reader equipment (bearing in mind that that RFID reader is considered to be capable of freeway or other open road application), is that, at least for permanent installation scenarios (i.e. where the reader is permanently installed to operate at a single location—as opposed to in a temporary relocatable manner), in order for the RFID antenna to be positioned at the correct position to "read" the tags on passing vehicles (which essentially requires, inter alia, the antenna to be positioned with its base plane parallel and level with the surface of the road), much of the associated RFID reader electronics, casing and also structural components, heatsinks, etc, must be installed "in" the road (i.e. below the road surface). Basically, so that the reader electronics, structural components, etc, in question can remain with or very near by the antenna (as opposed to being located some remote distance away), it is thought that, in permanent installation scenarios, these things really need to be "buried" beneath (or buried very nearby) the antenna in the road, beneath road surface level. One natural consequence of this is that, as part of the installation of such RFID readers, there is a requirement to cut or dig into the road in order to install the RFID reader. This can increase costs associated with the installation. It may often also require temporary closure of the road, or at least of the lane where the RFID reader is being installed. As mentioned above, this can be disruptive and costly. Nevertheless, it is considered that the costs associated with the permanent installation of these kinds of RFID readers remain significantly less than cost associated with construction of over-road gantries and the like, and the costs are therefore thought to remain acceptable, particularly given that such RFID readers are likely to be required only at particular locations when used in freeway and other open road applications. Indeed, the number or density of these kinds of RFID readers required (i.e. required to be permanently installed) in a road system/network deployment is likely to be comparatively low, and the cost of installation is therefore considered likely to be acceptable, particularly in comparison with the far greater cost of over road gantries installations and the like.

RFID readers which are capable of permanent "on-road" installation, and which therefore avoid (at least to some extent) the increased time and cost associated with cutting or digging into the road in order to perform permanent RFID reader installation, have previously been proposed. However, many of these previously proposed designs suffer from other problems or disadvantages, one of which is crosstalk and other RF noise, especially reflected signals from adjacent RFID readers.

Against the foregoing background, it is thought that it would be desirable if an antenna, and preferably also an associated RFID reader structure, could be provided which is capable of permanent or semipermanent on-road installation (not in-road installation—see below) and also suitable (when installed on the road) for reading RFID tags on vehicles' license plates, specifically in applications where vehicles are stationary or travelling at low speeds, such as for example in the above-mentioned kinds of vehicle parking and gating applications.

Even though considerable introductory discussion and background information is provided above, it is to be clearly understood that mere reference in this specification to any previous or existing antenna designs, devices, apparatus, products, systems, methods, practices, publications or indeed to any other information, or to any problems or issues, does not constitute an acknowledgement or admission that any of those things, whether individually or in any combination, formed part of the common general knowledge of those skilled in the field, or that they are admissible prior art.

SUMMARY OF THE INVENTION

In one form, the invention relates generally to an antenna for a communication device, the antenna having a structure comprising:
a ground portion (which may be substantially planar, in which case the ground portion will be in the form of a ground plane—however the ground portion need not necessarily be planar, or totally planar all over—instead it (or parts of it) could potentially be curved or stepped or otherwise provided in or with other shapes or shaped features), and
a radiating component,
  the radiating component having a first side, and a second side that is spaced apart from the first side, and
    the first side has a ground edge portion which is in contact with the ground portion, and the first side extends, from its ground edge portion, away from a surface on one side of the ground portion;
    the second side also has a ground edge portion which is in contact with the ground portion, and the second side also extends, from its ground edge portion, away from a surface (this may be the same or a different surface as the first side) on said one side of the ground portion; and
    the radiating component also has a joining portion which is spaced apart from the ground portion on said one side of the ground portion, and the joining portion extends between the first side and the second side, such that there is a region of space defined between the first side and the second side and between the joining portion and the ground portion; and
    at least one of the first side and the second side has a slot therein.

In the antenna described above, the region of space defined between (i.e. which is bounded in one direction by) the first side and the second side of the radiating component, and between (i.e. bounded in the other direction by) the joining portion of the radiating component and the ground portion, may be open at one or both ends. That is to say, the said space may be unbounded or open ended at one or other or both of the ends, or at least there may be no conductive or radiative antenna elements located in or across or covering the said end(s) of the said region of space. There may, however, be other parts or portions of e.g. an associated RFID reader structure, such as protective and/or structural and/or dielectric structures or the like, or electronic components associated with the RFID reader, which may be physically located in or across or near the said open end(s) of the said region of space. In some embodiments, the region of space defined between the first side and the second side of the radiating component and between the joining portion of the radiating component and the ground plane portion may be shaped substantially as a rectangular prism or box shape—see below.

It is thought that the configuration of the radiating component in the above antenna, and in particular the configuration of the first side, second side and joining portion (where one or both of the first and second sides is slotted), and the way a region of space is created between the first side and the second side and between the joining portion and the ground portion (which space may be open at either end, as just mentioned), allows the radiating component in particular to operate as a resonator. It is therefore thought that altering e.g. the size and relative proportions of the radiating component and its parts may be used to alter the way the radiating component operates as a resonator, and hence alter the affect of this on the overall radiation pattern produced by the antenna. Thus, altering the size and relative proportions, etc, of the radiating component and its parts may be one way (or at least part of what is involved) in the "tuning" the antenna to produce a desired radiation pattern.

It is anticipated that, in many embodiments of the antenna, the ground portion may be (as mentioned above) substantially planar and therefore take the form of a substantially planar ground plane. It is also anticipated that, in these embodiments, it may also be the case that the first side and the second side of the radiating component are themselves both substantially planar and rectangular, and both may be oriented with their planes substantially perpendicular to the plane of the ground plane. Having said this, embodiments are possible where one or both of the first side and the second side of the radiating component are non-planar, not planar all over, and/or where one or both of the first side and the second side are (or at least where their lower ground edge portions are) oriented relative to the antenna's ground portion at some non-perpendicular angle.

Referring to the above-mentioned embodiments in which the first side and the second side of the radiating component are both substantially planar and rectangular, and both are oriented with their planes substantially perpendicular to the plane of the ground plane, in some particular ones of these embodiments, for both the first side and the second side of the radiating component: the ground edge portion which is in contact with the ground plane may form one of the longer edges of the rectangular side; and there may be a distal side edge portion, opposite the ground edge portion, which forms the other of the longer edges of the rectangular side. And in such embodiments, the joining portion of the radiating component may be substantially unbroken (or at least unbroken by any gaps or major openings), planar and rectangular and it may extend between the distal side edge portions of the first side and the second side along the full length of the radiating component. There may, however, be other embodiments where, even if the joining portion is substantially unbroken, planar and rectangular (although it need not necessarily be all or any of these things), nevertheless the joining portion may extend between points on the first side and the second side other than the said respective distal side edges.

In many embodiments of the antenna, including those discussed further below, the first side and the second side of the radiating component may both have a slot therein. One or both slots may be an open slot. In any case, the (or each) slot in a side of the radiating component may extend approximately parallel to the side's ground edge portion, and the (or each) slot in a side of the radiating component may extend for almost the full length of the side's ground edge portion. It may be that the radiation pattern and/or the radiative properties/characteristics of the antenna can be controllably adjusted/altered (i.e. it may be that the antenna can be "tuned") at least partly by varying the distance that an open slot in a side of the radiating component is located above that side's ground edge portion and/or by varying the width of the open slot (i.e. by varying the size of the opening/gap that the slot forms in the side of the radiating component in the vertical direction). This may be in addition to the way altering the radiating component's shape, etc, can be used for tuning, as was mentioned above.

The antenna's feed point (which may be or include a cylindrical conductor) may extend between and connect the ground portion (which may be a ground plane as discussed above) and the underside of the radiating component's joining portion. In more detail, the antenna may be fed from the ground plane with a feed pin (cylindrical conductor) that is oriented perpendicularly to the ground plane and extends between and connects the ground plane to the underside of the joining portion half way along the length of the joining portion and half way between the first side and the second side of the radiating component. Where this is the case, the antenna may be said to be "centre fed".

It may be that the antenna emits vertically polarized energy, and this, it is thought, may be attributable to one or a combination of the following: the way in which the antenna is fed (see above); the configuration of the horizontal slots (see above). Where the antenna emits energy in the form of electromagnetic waves that are vertically polarised, this is thought to be advantageous because electromagnetic waves which are vertically polarised may propagate better when radiated from a ground plane (as in a monopole) than electromagnetic waves that are horizontally polarised.

In some embodiments (as mentioned above) the antenna's ground portion may be substantially planar, such that it is a ground plane, and the ground plane may also be rectangular with a length dimension and a width dimension, the length dimension being greater than the width dimension, and the radiating component may have a length (i.e. the longest dimension of the radiating component) which extends substantially across the width of the ground plane. In some embodiments, the length of the ground plane may be about $\lambda_0$, where $\lambda_0$ is the free space wavelength of the centre frequency of the antenna's operating signal, albeit optionally the length of the ground plane may be reduced to less than $\lambda_0$ through, or as part of, antenna tuning (this is in addition to the other options for antenna tuning mentioned above). The width of the ground plane may be about $0.55\lambda_0$ or greater, and where this is the case, the length of the slot in the first side and/or the second side may be about $0.5\lambda_0$. The joining portion of the radiating component may be spaced apart from the ground plane by about $0.06\lambda_0$. In some embodiments, the first side and the second side of the radiating component may be spaced apart by about $0.2\lambda_0$, such that both the first side and the second side are each spaced apart from the feed pin by about $0.1\lambda_0$. However, all of this too may be subject to some variation because, as mentioned above, altering the size and relative proportions, etc, of the radiating component and its parts may be one way (or at least part of what is involved) in the "tuning" the antenna.

The antenna's ground portion and/or radiating component may be made from an electrically conductive material, although the ground portion and the radiating component, respectively, need not necessarily be made from the same material—indeed the two may be made from different materials with different electrical conductivity and/or other differing material properties. The material(s) used for the ground portion and radiating component may also differ in thickness and other physical parameters. In some embodiments, the antenna's ground portion and radiating component may both be made from a metal (such as e.g. aluminium or copper) or metal-based material (although, again, both need not necessarily be made from the same metal or metal-based material).

In some other embodiments, the radiating component might be made from (or made up of) wires that are each very (or extremely) thin but formed from (very) highly electrically conductive material (e.g. such as silver, aluminium, gold, copper, alloys thereof, graphite, etc). Where this is the case, the individual wires may be arranged (i.e. positioned and oriented relative to one another) such that, together, they define an overall shape of the radiating component that is as described above and/or as shown FIG. 3, FIG. 4, FIG. 5, FIG. 7, etc, below. Typically, a number of the very thin wires, which are positioned close together, may be required (e.g. they may be arranged parallel to one another, or crossing over one another, or in a grid pattern, or the wires may trace out (a) curved or wavy surface-area-covering path(s)) to thereby create a radiating component for the antenna that is of equivalent shape and functionally equivalent to the radiating component described above (i.e. functionally equivalent to a radiating component of the same shape but which is made from conductive solid/sheet/plate/film material, as described above). However, the important thing is that it IS thought to be possible to use thin, highly conductive wires to create a radiating component for the antenna which is functionally equivalent to a similarly shaped radiating component made from unbroken solid/sheet/plate material. And furthermore, where the radiating component is formed from thin, conductive wires, even though these may need to be positioned close together, there will nevertheless still be gaps (i.e. open spaces) between individual wires. Recall also that the wires themselves should all individually be VERY thin, which means the gaps in between may be larger (possibly much larger) than the thickness of the wires themselves. This (i.e. the fact that the open spaces between the wires may be larger than the wires themselves) may mean that not only is it possible to create a radiating component that is functionally equivalent to a "solid" radiating component as described above (i.e. equivalent to those made from solid/sheet//film which therefore have no open spaces therein, other than the "slots" that form part of the overall shape) but also a radiating component thus made from such thin conductive wires may itself be optically transparent. In other words, it may be possible to see through the radiating component, and in fact, the wires may be so thin that they are actually invisible to the human eye from any non-macro distance—meaning the whole radiating component of the antenna may actually be invisible to the naked human eye. And this, when combined with the fact that other parts of the RFID reader structure may also be optically transparent, may have significant ramifications (i.e. it may open possibilities), including in relation to allowing the RFID reader to be solar powered, and where the solar panels may be located.

The antenna may be configured to be used with an operating signal having a range of frequencies. It is thought that most embodiments will operate in the UHF (ultra high frequency) band (UHF is the International Telecommunication Union (ITU) designation for radio frequencies in the range between 300 MHz and 3 GHz), although it is thought that it will be more usual (or more likely) that embodiments will operate with an operating signal frequency of about 860-940 MHz. Those skilled in the art will understand, however, that the actual operating frequency may vary, or it may need to be different, say, in different jurisdictions due to the different UHF frequency allocations applicable in different jurisdictions (and hence different rules governing which frequencies are permitted for what uses).

The radiation pattern of the antenna may be directional, including (without limitation) substantially bi-directional in the azimuth plane. In saying here that the radiation pattern may be bi-directional in the azimuth plane, what is meant is that, basically, if the antenna were to be positioned horizontally on the ground or road surface (or on the X-Y plane as in the in the Figures discussed below), the antenna's radiation pattern would have predominant/main portions (i.e. regions of greatest radiation energy concentration) pointing in two main horizontal directions (or two directions in the X-Y plane). It happens that, in the examples in the Figures below, those two directions are essentially horizontally opposite one another—i.e. in the +Y and −Y directions.

In preferred embodiments, the antenna's radiation pattern shape may have, for each of these two directions, one or more round or bulbous "lobe" shaped portions (and the word "lobe" here is used in the sense of connoting a shape similar or analogous to the opposing lobes of a human brain). These lobe shaped portions of the radiation pattern may be the regions of major or greatest radiation energy concentration from the antenna. Each of the "lobe" shaped portions may generally point away from the radiating component in a lengthwise direction of the antenna (i.e. relative to the length direction of the ground plane), and at least the majority of each "lobe" may be located at (or contained within) an angle of between 0° and 90° elevation above the ground plane (i.e. between 0° and 90° above the X-Y plane, or between e=0° and e=90° and φ=0° and φ=90°, in the Figures). What all this essentially means is that the majority of the energy radiated by the antenna may be located in these "lobe" shaped portions of the antenna's radiation pattern, the lobes may be directed away from the radiating component in both the antenna's forward and aft/rearward directions, and the lobes may be (at least mostly) above the plane of the antenna's ground plane. This last point, namely that the lobes may be (or are, at least mostly) above the plane of the antenna's ground plane, is important because what it means is that, if the antenna is used as part of an RFID reader located on the surface of a road, the antenna is directing ("pointing") the greatest amount of its energy into the areas (or focusing most energy into the regions) relative to the antenna where vehicle license plates (bearing RFID tags thereon) are likely to become positioned—so in other words the antenna is focusing energy where it needs to to best achieve "read" of tags on vehicle license plates. In some preferred embodiments, within a plane that is perpendicular to the antenna's ground plane and aligned with the lengthwise centreline axis of the ground plane (i.e. in the Y-Z plane in the Figures), the 3 dB beam width of the antenna's radiation pattern may be contained within the angle range of between about 30° and about 65° elevation above the ground plane (i.e. θ=about 30° to about 65° and φ=about 30° to about 65°).

Another point to be made is that, whilst the antenna's radiation pattern may be described as comprising two "lobe" shapes, and examples of radiation patterns thus shaped are given in the Figures, the respective lobes themselves (and the radiation pattern more generally) does not actually have a definite edge or boundary. Therefore, it is not correct to say that something is either inside, or outside, the antenna's radiation pattern. The antenna's radiation pattern (at least in a theoretical sense) actually extends in all directions and into all regions of space around the antenna (theoretically to infinity—i.e. the radiation pattern theoretically does not ever stop or end). However, the strength (or the energy density) of the antenna's emitted radiation drops or becomes lower (quite quickly) as distance from the antenna increases, and also energy is not radiated out by the antenna with the same/equal strength or intensity in all directions. On the contrary, energy is radiated by the antenna much more strongly in some directions and much less strongly in other directions. Thus, the "lobes" of the antenna's radiation pattern are related to (or they come about partly as a consequence of) the directions extending outward into the regions of three-dimensional space around the antenna where the density of the energy radiated by the antenna is greatest (i.e. the lobes correspond essentially to the regions of greatest energy density—but see below for further discussion on the edge/boundary of the lobes).

Following on from the above, whilst in theory the antenna's radiation pattern may be considered to extend to infinity, nevertheless due to the nature of digital electronics, there is (or there may be said to be) an edge or boundary within the antenna's radiation pattern, which may (in this instance) be thought of as defining the outer edge or boundary of the lobes. This edge or boundary is not, however, a feature of the radiation pattern itself, for the reasons discussed above. Rather this edge or boundary becomes defined as consequence of the relationship between the energy radiated by the antenna (as an RFID reader antenna) and the operation of an RFID tag that exchanges information with the (RFID reader) antenna. More specifically, the said edge or boundary within the (RFID reader) antenna's radiation pattern takes its shape (i.e. the surface shape of the lobes e.g. as depicted in the Figures in this case) and it is defined by the locus of points in three-dimensional space where the density of the energy radiated the (RFID reader) antenna becomes great enough to communicate with an RFID tag that is within the (RFID reader) antenna's radiation pattern. This may be conveniently explained with reference to so-called passive RFID tags, although it is to be clearly understood that the present invention is by no means limited to use with only passive RFID tags (i.e. the invention could also be used with so-called active RFID tags and indeed any other forms of RFID tags). A passive RFID tag is an RFID tag that does not contain its own battery or other power source. Instead, a passive RFID tag is itself (i.e. the tag's antenna and also all of the tag's operating electronics are) powered by the energy radiated by the RFID reader antenna. Now, due to the nature of digital electronics, there will always be a certain minimum amount of power that is required in order to operate a given passive RFID tag (e.g. to enable it to power on and transmit a signal using its own antenna back to the RFID reader antenna, etc). Naturally, however, the amount of power that is required to operate different passive RFID tags may differ (note that the amount of power that a passive RFID tag requires to power on and operate is often described as the tag's sensitive). Accordingly, some passive RFID tags with lower sensitivity may need more power before they can power up and operate etc, and so these may need to get closer to the RFID reader antenna (where the density of the energy radiated by the antenna is greater) in order to operate and communicate with the RFID reader antenna. On the other hand, other passive RFID tags with higher sensitivity may require less power to turn on and operate, and therefore they may be able to turn on and operate at a greater distance from the RFID reader antenna. The point is that, as a result of this, the above-mentioned edge or boundary within the radiation pattern (i.e. the surface shape of the lobes of the radiation pattern in this case, in three-dimensional space), which is defined by the locus of points where the density of the energy radiated by the antenna becomes great enough to enable an RFID tag to communicate with the RFID reader antenna, is not actually fixed. Rather, its location (i.e. how far out from the antenna this edge or boundary is) is dependent, assuming the amount of energy radiated by the antenna remains fixed/set, on the sensitivity of the RFID tag. Therefore, in the context of the present invention, the "size" of the lobes of the antenna's radiation pattern (i.e. how "big" the lobes are relative to the size of the antenna), assuming a set power output from the RFID reader antenna, will be larger for more sensitive tags and smaller for less sensitive tags.

However, a further point that must then be made is that, when the present invention is put into practice, the RFID tags used on vehicle license plates (regardless of whether they are passive RFID tags or some other form of tag) should have a sensitivity such that the "required read zone" (inside which the RFID reader must be able to communicate with a vehicle's plate-mounted RFID tag if the vehicle's tag is within the said region), the size and shape which is described above with reference FIG. 1 and FIG. 2, falls within the "lobes" of the antenna's radiation pattern. In other words, the power output from the RFID reader antenna should be such that, and in combination the sensitivity of the RFID tags on vehicle license plates should also be such that, there is no part of the required read zone described above that is outside the edge or boundary of the lobes of the antenna's radiation pattern.

In another form, the invention relates generally to an RFID reader capable of installation on a road or ground or floor surface, wherein an antenna incorporated in the RFID reader and which is used by the RFID reader for RFID communication is an antenna as described above.

If or when the RFID reader is installed on the road or ground or floor surface, the antenna's ground portion may be positioned on the road or ground or floor surface such that the antenna's radiating component is on the opposite side of the of the ground portion from the road or ground or floor surface—in other words, such that the underside of the antenna's ground portion sits face down on the road or floor surface (or possibly face down on one or more thin intermediate layers, e.g. an adhesive layer for securing the RFID reader to the road and/or some other thin intermediate shielding or other layer(s)), and the antenna's radiating component sits on top of (and projects upward from) the upper side of the antenna's ground portion.

The RFID reader may also incorporate one or more rigid portions. There may be one or more rigid portions with (a) sloped upper surface(s), wherein:

the slope of the upper surface of each rigid portion begins at (or about) the level of the antenna's ground portion (which means that the rigid portion begins at road or ground or floor surface level if the reader positioned such that the antenna is on the ground);

each rigid portion slopes generally (or overall) upward (from the level of the antenna's ground portion) toward the antenna's radiating component, and the sloping upper surface of each rigid portion meets the antenna's radiating component at about the level (i.e. height) of the joining portion of the antenna's radiating component (i.e. so the sloping upper surface of each rigid portion meets the antenna's radiating component at (or about) the highest point on the antenna's radiating component).

There may be a rigid portion beginning at an end edge of the antenna's ground portion (i.e. this rigid portion may begins at the edge that forms the forward or rear end edge of the antenna's ground portion in the antenna's lengthwise direction), and the said rigid portion may slope up from there to meet the antenna's radiating component at the level (i.e. height) of the radiating component's joining portion, such that portions or areas of the antenna's ground portion which are in between the said end edge of the ground portion and the antenna's radiating component are beneath the rigid portion. Basically, portions or areas of the antenna's ground portion which are in between the said end edge of the ground portion and the antenna's radiating component may be covered by the rigid portion which is located (i.e. it sits) directly on top thereof. Portions or areas of the antenna's ground portion that are covered by the rigid portion, and also a side or portion of the antenna's radiating component, may therefore be protected (e.g. from physical damage or exposure to the elements, etc), and the radiating component is structurally supported, by the presence of the rigid portion.

Alternatively, there may be a rigid portion beginning at each of the end edges of the antenna's ground portion (i.e. these rigid portions may begin at the edges that form the forward end edge, and rear end edge, respectively, of the antenna's ground portion in the antenna's lengthwise direction), and the said rigid portions may slope up from the respective end edges to meet the antenna's radiating component at the level (i.e. height) of the radiating component's joining portion, such that portions or areas of the antenna's ground portion, on either side of the antenna's radiating component, which are located between the antenna's radiating component and the respective end edges of the antenna's ground portion are beneath the rigid portion. Basically, again, portions or areas of the antenna's ground portion which are in between the said end edges of the ground portion and the antenna's radiating component may be covered by the rigid portions which are located (i.e. they sit) directly on top of these portions of the ground portion. And again, these portions or areas of the antenna's ground portion that are covered by the rigid portion, and also side portions of the antenna's radiating component, may therefore be protected (e.g. from physical damage or exposure to the elements, etc), and the radiating component is structurally supported, by the presence of the rigid portions).

There may also be at least one rigid portion beginning out beyond one side edge of the antenna's ground portion (i.e. this/these rigid portion(s) may begin(s) further out to one side than the edge of the ground portion that forms one of the long sides of the antenna's ground portion in the ground portion's lengthwise direction), and the said rigid portion(s) may slope up from there to meet the antenna's radiating component at the level (i.e. height) of the radiating component's joining portion. This/these rigid portion(s) may help to protect the antenna's radiating component and other parts of the antenna along the side of the antenna from damage (e.g. physical damage or exposure), and these rigid portions may also help to structurally support the antenna's radiating component.

Alternatively, there may be a at least one rigid portion beginning out beyond the side edges of the antenna's ground portion on both sides of the ground portion (i.e. these rigid portions may begin further out to either side than the edges of the ground portion that form the respective long sides on either side of the antenna's ground portion in the ground portion's lengthwise direction), and the said rigid portions may slope up from there to meet the antenna's radiating component at the level (i.e. height) of the radiating component's joining portion. Again, these rigid portions may help to protect the antenna's radiating component and other parts of the antenna along the side of the antenna from damage (e.g. physical damage or exposure), and these rigid portions may also help to structurally support the antenna's radiating component.)

Preferably, there may be a rigid portion sloping up to meet the antenna's radiating component on all sides of the antenna's radiating component. In other words, the one or more rigid, upwardly-sloping portions may effectively surround the antenna's radiating component in the horizontal/X-Y/azimuth plane, and this may therefore help to structurally support the antenna's radiating component from all sides.

The RFID reader's rigid portions may, in fact, be some of the (if not the) primary components which provide the physical supporting structure for the RFID reader's antenna, and the RFID reader generally. This can be understood quite simply. As mentioned elsewhere, components of the antenna, such as the radiating component in particular, may be made from a conductive material (typically metal). In fact, the radiating component will generally be made from fairly thin metal, perhaps only a few millimeters or possibly even less than a millimeter in thickness (or in the case of the conductive wires that may be used for the radiating component, these may be only a small fraction of a millimeter in thickness). The radiating component is also elevated relative to (i.e. it is located vertically above) the antenna's ground portion/ground plane (when the reader is installed on the road). Naturally, thin metal such as this, especially if elevated/upstanding and unsupported in "free space", can be very flexibly and flimsy. It should also be recognised that, by virtue of its location in its main expected use (e.g. on a road surface), the RFID reader may often be directly run over by vehicles. Clearly, it is essential for the RFID reader (including its antenna structure) to be able to withstand such forces and impacts repeatedly and over a long period of time without damage or affect on the reader's/antenna's functioning or performance. It is therefore also clear there needs to be something to prevent any otherwise thin/flimsy pieces of metal that make up or are comprised in the RFID reader or its antenna (in particular the radiating component) from simply being crushed/flattened and completely destroyed by such vehicle impacts. It is this function that the rigid portions helped provide. In other words, the rigid portions provide a physical structure which not only can withstand such vehicle impacts itself, but it also provides a supporting structure for other parts of the antenna, such as the radiating component, which themselves could not withstand such impacts but which can withstand such impacts when supported by the rigid portions.

The slope (or the various slopes) of the or each rigid portion may be sufficiently gentle (i.e. not steep) so as to allow vehicle wheels/tires to roll over the RFID reader (i.e. directly over the top of the whole RFID reader, or over a portion of the RFID reader), and also such that there is at least a somewhat reduced risk or likelihood of a person tripping or stumbling or injuring themselves should they accidentally kick or trip on the RFID reader if the RFID reader is installed on the road or ground or floor surface. For this purpose, it is thought that the slope of the upper surface on any rigid portion of the RFID reader should preferably be no steeper than 45°.

It is thought to be important that, if or when the RFID reader is installed on a road or ground or floor surface, the maximum thickness of the RFID reader in a direction perpendicular to the road or ground or floor surface (i.e. the maximum height of the RFID reader) should be no more than about 25 mm. This maximum thickness (about 25 mm) is considered to be acceptable, and it is also thought to be also compliant from a standards/regulatory point of view, as this is the same height as (or perhaps it may even be slightly less than) the height of many conventional "cat eyes" and other retroreflective devices commonly used on public roads.

Each of the above mentioned rigid portions of the RFID reader (or at least some of them, if not all) may be formed as a substantially solid portion of material (i.e. not hollow, or at least with little or no space or gaps inside or underneath). It may also be the case that any rigid portions in the RFID reader are substantially unitary (i.e. formed together on or around the antenna in a singular/integral manner). Alternatively, it may be that, where the RFID reader has more than one rigid portion, at least one said rigid portion is initially formed separately from at least one other said rigid portion and these may be subsequently brought or assembled together along with any other rigid portion(s), the antenna, and any other parts or components, when the RFID reader is formed/assembled.

The material from which at least one (preferably more than one, and even more preferably all) of the rigid portions is formed is preferably physically strong/tough and durable (i.e. so as to be able to withstand repeated impact loading e.g. when vehicles drive over the top, and so as to thereby provide the structural support for parts of the RFID reader's antenna, etc). The material from which at least one (preferably more than one, and even more preferably all) of the rigid portions is formed may also have dielectric properties which do not substantially interfere with the impedance matching and/or radiation performance/characteristics of the antenna, or it may be that the dielectric properties of the material can be used (e.g. by altering the shape of one or more of the rigid portions made from this material) to controllably alter (i.e. tune) the antenna's radiation pattern and/or its radiation performance/characteristics. The material from which at least one (and preferably some or all) of the rigid portions is formed may also be optically transparent, or at least optically translucent (including so as to allow for light to be emitted by light emitting components (see below) and also so that any solar panel(s) that may be incorporated into the RFID reader (and covered or inside the rigid portion material) can receive light/solar radiation which the solar panels convert into electrical energy). Suitably, the material from which at least one (and preferably some or all) of the rigid portions is formed may be a type of polycarbonate, polyethersulfane, or like material. Examples of specific materials that may be suitable include the materials produced by the Röchling group of companies and sold under the names/trade marks SUSTARIN C, SUSTANAT PC and SUSTASON PES.

As mentioned above, in the antenna (which forms part of the RFID reader), there is a region of space defined between the first side and the second side of the antenna's radiating component and between the joining portion of the antenna's radiating component and the antenna's ground portion, and this region is open at either end. The RFID reader may further includes one or more light emitting components (e.g. such as LEDs, lights or the like) which may be located or housed in one or both of the said open ends. Alternatively, or in addition, the RFID reader may includes one or more light-emitting components (e.g. such as LEDs, lights or the like) located within (or within the material of) one or more of the rigid portions, even if this location is outside, rather than within, the space inside the antenna's radiating component.

At least some of the RFID reader's electronics and circuitry may be located within the region of space defined between the first side and the second side of the antenna's radiating component and between the joining portion of the antenna's radiating component and the antenna's ground portion. Also, at least the antenna's radiating component (and possibly also the antenna's ground portion) may be made from a metal or metal-based material (or at least a material which, in addition to being suitably electrically conductive, is also suitably thermally conductive) and as a consequence of this at least the antenna's radiating component may be operable to (i.e. it may, as a secondary function) help dissipate at least some of the heat generated by any RFID reader electronics and circuitry located within the said region of space (i.e. any circuitry that is located within the cavity inside the antenna's radiating component). Note that the option or ability to use the antenna itself (or a portion of it) as the RFID reader's heatsink is part of what may enable the present RFID reader to be installed simply on the road surface, because there may consequently be no need for additional heatsinks which might otherwise have needed to be e.g. located or buried beneath the surface of the road or the like. The lower power consumption of this RFID reader, achieved through reduced duty cycle, etc, and consequently the lower amount of heat generated, also contribute to this.

The RFID reader may be capable not only of RFID communication using the abovementioned antenna (the main antenna), but also of separate wireless communication with one or more other electronic devices (such as nearby computers, mobile devices, etc). This may be done using commercially available data-over-power methods, or by conventional wireless methods (e.g. Bluetooth, Wi-Fi, etc)). The RFID reader may incorporate a secondary antenna (i.e. another antenna which is separate from the main antenna used by the RFID reader for RFID communication), and the secondary antenna may facilitate said separate wireless communication with other electronic devices. The secondary antenna may be located at a location within the RFID structure that does not substantially interfere with the radiation pattern and performance of the RFID reader's main antenna. Therefore, one possible option for the location of the secondary antenna (and this is only one possible location option—there may be others) is to one side of the RFID reader structure (i.e. on one side of the RFID reader's structure alongside an edge of the reader's main RFID antenna).

The RFID reader may be powered in any suitable way. Options include that the RFID reader is powered by induction loop or by power-supply wires/cables connected to the RFID reader (connected once it has been installed). Alternatively, or in addition thereto, the RFID reader may incorporates one or more solar (photovoltaic) cells. It is possible that, in some embedment's, the solar cells may be operable to produce and supply to the RFID reader enough electrical energy to partly or even fully power the RFID reader (or certain parts or components of the rear, or certain of its functionalities). The solar cells may be located on top of the joining portion of the radiating component of the RFID reader's (main) antenna.

Recall from above that the RFID reader's rigid portions may be optically transparent. Recall also that (at least in some embodiments) the radiating component of the antenna may be made from thin, electrically conductive wires, and that this may enable the radiating component of the antenna to also be optically transparent. Accordingly, it should be recognised that (possibly with the exception of some of the RFID reader's internal electronic components, etc), a significant proportion at least of the structure of the RFID reader (including the radiating component of the antenna) which is located above the level of the antenna's ground plane may be optically transparent. The reason this is important is because it may mean that solar panels used to generate power for the RFID reader may (rather than being mountable only in the limited space on top of the joining portion of the antenna's radiating component) actually be mounted at the level of (or directly on) the antenna's ground plane. There is more space/surface area here, and so this may allow more or larger solar panels to be used (which can provide more power per unit time). Furthermore, it is even possible that said solar panels (or the solar/photovoltaic elements thereof) could be used to form the antenna's ground plane (i.e. the solar/photovoltaic elements themselves may actually BE the antenna's ground plane). This is thought to be possible since solar panels (or the solar/photovoltaic elements thereof) are conductive (and could therefore provide a conducting plane that operates as an antenna ground plane) at the frequencies at which the present antenna will operate (860-940 MHz UHF)

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION

Figure 1:
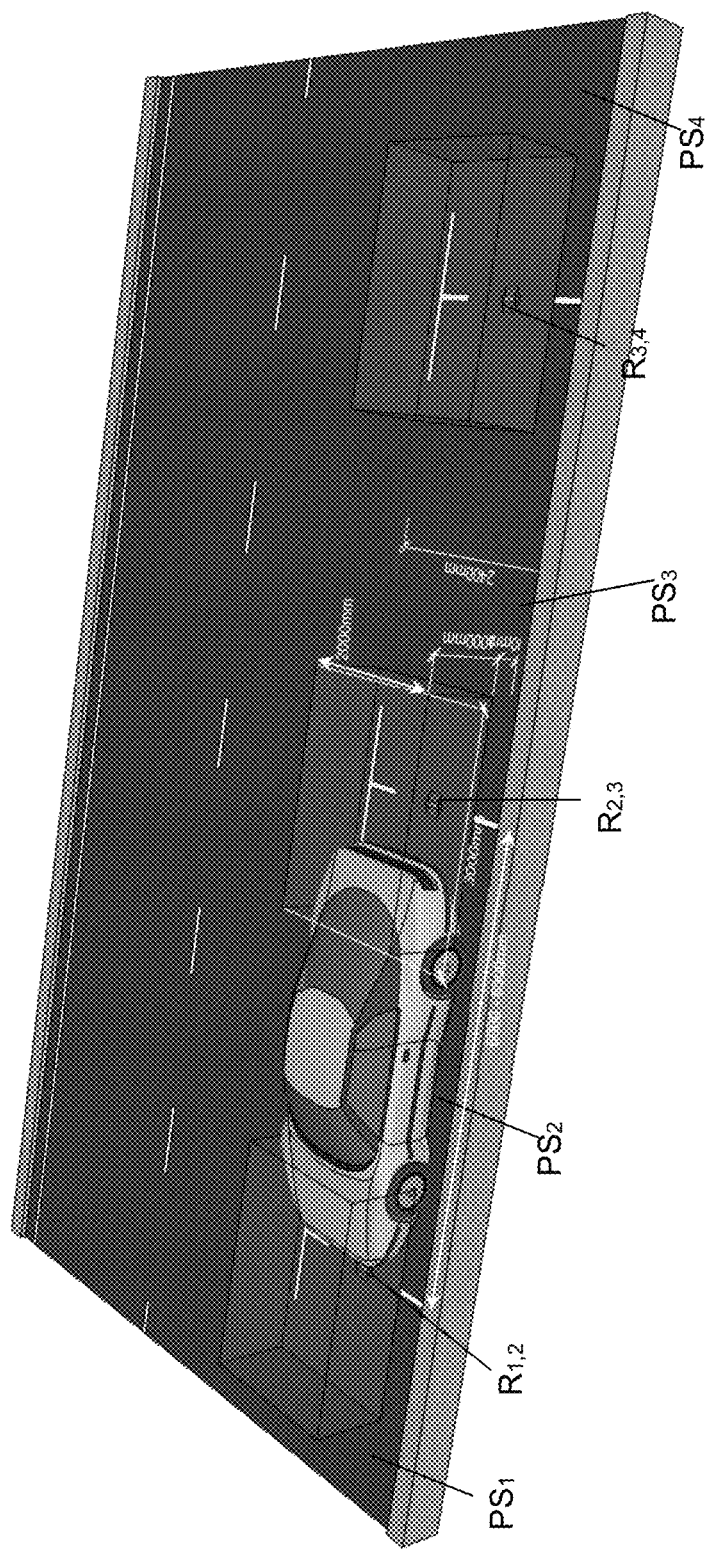
FIG. 1: Schematic illustration of the required read zone for each of three (identical) on-road RFID reader antennas to be used for vehicle detection and identification in one particular (albeit non-limiting) roadside parallel parking application

As explained (at least in part) in the Background section above, the RFID reader described in detail in patent application '994 is designed so as to be capable of permanent installation such that the reader's antenna becomes located correctly to "read" (i.e. to detect and positively identify) RFID tags on passing vehicles' license plates. For that RFID reader, this in turn requires (among other things) the RFID reader to be installed such that the ground plane of the reader's antenna is, basically, at road surface level. Importantly, the power and also the performance (including high duty cycle, etc) of the particular RFID reader in patent application '994 are such that the reader is capable of "reading" (i.e. detecting and positively identifying) vehicles' plate-tags even in freeway or open road scenarios. In other words, it is capable of doing so even when vehicles are travelling at the kinds of high speeds that may be expected on such roads. It is also capable of use in situations where vehicles may pass the RFID reader antenna in different directions, etc.

However, it is also explained (at least in part) in the Background section above that because of the ability of the RFID reader in patent application '994 to provide this high level of performance, and also due to the fact that permanent installation of that RFID reader must be "in-road" (i.e. it requires digging or cutting of the road), the overall cost of that RFID reader, including its in-road installation, is comparatively high. The cost thereof is still thought to be considerably less than the cost of conventional RFID systems that rely on RFID readers placed on over-road gantries and the like, and the cost is therefore thought to still be acceptable (or non-prohibitive) for the commercial viability of that RFID reader for use in freeway another open road applications.

However, in vehicle parking applications for example, in order to, say, monitor every single/individual vehicle parking space in a parking lot, there is (or may be) a need for a large number of permanently installed RFID readers. This may remain true even if a single RFID reader is able to monitor two (or multiple) separate vehicle parking spaces. Thus, for vehicle parking applications in particular, the number or density of required (permanently installed) RFID readers in the area covered by a given RFID system deployment (e.g. the number of readers required to monitor all parking spaces in a parking lot) may often be high. Naturally, the greater the number of RFID readers required, the greater cost of the deployment of the RFID vehicle detection and identification system, at least in terms of initial equipment purchase, and likely also in terms of system installation. Consequently, even though the performance of the RFID reader described in patent application '994 is such that that reader (or a modified version of it) might perhaps also be capable of use in some vehicle parking (and similar) applications, the performance capabilities of that RFID reader are actually thought to be unnecessarily high for such applications. The antenna's radiation pattern in the RFID reader described in patent application '994 may also not actually be ideally suited to parking applications (see below). Furthermore, given that permanent installations of that RFID reader must necessarily be "in-road", and that this adds to the overall costs due to installation costs associated with this (due to the need for digging into the road etc), if the RFID reader described in patent application '994 were used in a parking application, the cost of installation (bearing in mind the number of RFID readers that may be required) may be high, possibly making the cost difficult to justify. Having said this, conventional RFID systems that rely on over-road gantries and the like are generally even more expensive, and therefore the cost that might be associated with installation of one of those in a parking scenario may be even more prohibitive.

Nevertheless, continuing to refer to the example of a vehicle parking application, the fact remains, it is thought, that there are clear business and other reasons why it is desirable to be able to detect and positively identify a specific vehicle in a specific parking bay. Some of these reasons are, for example, to assist with automated parking payments, administering parking concessions (e.g. use of disabled parking bays only by vehicles pre-authorised to do so), parking restriction enforcement (e.g. identifying if a vehicle is parked in a space outside of the permitted times, or if a vehicle in a space is one that is not authorised to park there), etc. It is hoped that the present invention may assist with this kind of thing, and also in the automation thereof.

The desire to provide an RFID reader that is cheaper than the RFID reader described in patent application '994, both to produce and install, and which is preferably also more suited to the kinds of vehicle parking or gating (or other like vehicle presence or access control) applications discussed above (as opposed open road and freeway applications), is a large part of what lead to the development of the present invention.

Furthermore, the present invention was also arrived at only after a number of other important realizations were made. Some of these are summarised below.

One important realisation that helped lead to the development of the present invention is that, in the kinds of vehicle parking or gating (or other like vehicle presence or access control) applications in which the present invention is thought to be of use, vehicles generally will not pass by the RFID reader's antenna in different directions. Indeed, in the case of an RFID reader used in a vehicle gating application (e.g. an RFID reader located near a vehicle boom gate and used to read vehicles' RFID tags and subsequently open the gate to allow passage for authorised vehicles, or not if the vehicle is unauthorised), the vehicles will always approach the gate in the same direction. Likewise, in the case of an RFID reader used to read the RFID tag on any vehicle that pulls into a particular parking space, whilst vehicles might drive forwards into the said space, or alternatively reverse into the said space, nevertheless vehicles will always move (and approach the antenna) in the same direction (into the space) as they enter the said parking space. Thus, these kinds of vehicle parking or gating (or other like) applications are quite different to some of the open road scenarios discussed above where vehicles might potentially pass over the RFID reader's antenna in different directions (e.g. if the antenna is used at a crossroads or the like).

Hence, it might be said that, in the kinds of vehicle parking or gating (or other like) applications in which the present invention is likely to be used, the direction of travel of vehicles whose RFID tags are to be read by the RFID reader can generally be known with much more confidence than in some of the open road situations above. Furthermore, not only is the direction of travel of vehicles likely to be known with greater confidence, but also the actual location of the vehicles relative to the RFID reader antenna is also likely to be known with greater confidence. For instance, in the case of a vehicle boom gate application, a vehicle boom gate is generally little wider (if at all) than a single vehicle lane (or perhaps no wider than the single lane road blocked by the gate). Consequently, in order for a vehicle to pass through the gate, as it approaches the gate, the vehicle must be located (and it must be moving) within the boundaries of the vehicle lane (or within the boundaries of the single lane road). The vehicle cannot be outside the lane/road boundaries otherwise it might risk colliding with an upright pillar or bollard or wall (or some other like barrier) on one side or other of the boom gate. Likewise, in the case of a vehicle parking space, a correctly-parked vehicle must (by definition) be located within the marked/defined boundaries of the parking space. Thus, unlike in freeway and other open road scenarios (discussed in the Background section above) where there is a possibility that a vehicle could be located anywhere in a particular road lane, or possibly even across lanes, in these kinds of vehicle parking or gating (or other like) applications, the actual position of the vehicle can generally be known (it is thought) with much greater confidence.

One important consequence of the fact that the direction of travel of vehicles, and also the actual location of vehicles relative to the RFID reader antenna, may be predicted with greater confidence in these kinds of applications, is that, as a result of this, it is actually not necessary/essential (or even necessarily highly preferable) for the antenna used in these applications to have a non-directional (or omnidirectional) radiation pattern in the azimuth plane (i.e. parallel to the ground). Instead, the antenna can have a directional (or at least somewhat directional) radiation pattern in the azimuth plane (parallel to the ground), and the radiation pattern may e.g. be oriented (or "pointed") in the appropriate direction(s) based on the more-confidently-known direction of movement and/or location of the vehicle(s). The fact that the RFID antenna used in these applications need not necessarily have a non-directional radiation pattern in the azimuth plane alleviates a number of significant design challenges associated with the antenna's design, as compared to antennas intended for freeway or open-road applications as discussed above (a number of these design challenges are elaborated on in, or evident from, patent applications '384 and '994).

Another important realisation that helped lead to the development of the present invention is that, in the kinds of vehicle parking or gating (or other like) applications in which the present invention is likely to be used, vehicles may not always pass directly over the top of the antenna. Or even if they do, they will generally be moving at sufficiently low speeds that "reading" (i.e. the detection and positive identification of the vehicle based on RFID communication with its plate-mounted-tag) will have been completed/achieved before the vehicle passes over the top. For example, in a case where an RFID reader is located to monitor (i.e. to detect and identify) any vehicle that enters a particular parking space, that reader may often be (although it need not necessarily be) located on the boundary of the parking space, or possibly even outside the boundary of the parking space. Consequently, any vehicle that pulls into that parking space correctly (i.e. such that the vehicle is located within the space and not parked across the space boundaries or the like) will not pass over the top of the reader at all. Or, in an alternative example, where the RFID reader is used in a vehicle boom gate application (i.e. to detect and positively identify vehicles, and to only open the gate to allow passage for authorised vehicles) the reader in this case may be located on the road near the boom gate, and therefore a vehicle may well pass over the reader (albeit perhaps only if it is allowed to travel through the open gate); however if the gate does open thereby allowing the vehicle to pass over the top of the reader and through the gate, this means that by that time the "read" of the vehicle's plate will necessarily have been (successfully) completed. This in turn means that the potential for "blinding" reflected radiation, or at least the potential for difficulties or failures in achieving a "read" of a vehicle's plate as a result of this, may be less problematic (as compared to antennas intended for freeway or open-road applications as discussed above), and there may therefore be less of a need for the antenna design to achieve a radiation pattern that limits or minimises upwardly-pointing radiated energy. This too alleviates a number of significant design challenges associated with the antenna's design, as compared to antennas intended for freeway or open-road applications discussed above.

Yet another important realisation that helped lead to the development of the present invention is that, because vehicles are moving at such low speeds (if not stationary) in the kinds of vehicle parking or gating (or other like) applications in which the present invention is likely to be used, the vehicle will consequently be within the antenna's "read zone" for a much greater period of time. This in turn opens up a number of possibilities; for example, the possibility of using a lower (perhaps significantly lower) duty cycle. Another possibility is that of perhaps needing to supply less (maybe much less) power to the antenna, as it may not be necessary for the physical size of the antenna's read zone to be so large. In other words, because vehicles will generally be moving much more slowly in these applications (if they are not stationary) it follows that, even if the physical size of the antenna's read zone is reduced somewhat by reducing the power to the antenna, nevertheless vehicles will still be within the antenna's read zone for a considerably longer period of time than will often be the case in freeway or open road scenarios—long enough for a successful "read" to be performed, even if the duty cycle used in the RFID reader equipment is also lower. One consequence of using a lower duty cycle is that the overall power consumption of the RFID reader may be significantly reduced. Likewise the same general consequence (i.e. reduced overall power consumption) follows if a lesser amount of power is supplied to the antenna. And naturally, the extent of the potential overall power consumption reduction is even greater if both a lower duty cycle is used and a lesser amount of power is supplied to the antenna. In any case, these factors may make the issue of delivering sufficient power to the RFID reader less challenging from a design point of view, and it may also open up additional possibilities for powering the RFID reader including, for example, optionally using solar panels on the RFID reader unit itself (either exclusively or as a supplement to some other power source) to provide power to the RFID reader (this solar power option is of course generally only applicable to RFID reader units intended for use in outdoor or naturally lit areas). If it is possible for the RFID reader unit to be powered exclusively by one or more photovoltaic cells provided on the RFID unit itself (and this is currently thought to be possible), this may remove the need for power to be supplied from any other remote source (at least in applications or locations where the RFID reader units are able to be solar powered).

Yet another important realisation that helped lead to the development of the present invention is that, as mentioned above, in parking applications especially, in order to monitor, say, every single individual parking space in a parking lot, a large number of RFID readers may be needed. This is true even if one reader is able to monitor two (or multiple) separate spaces. Thus, for parking applications especially, the number of required readers in a given system is potentially high. This increases the cost. In order to balance this potential for high cost (due to the need for high numbers of RFID reader units), it is considered highly desirable to avoid, if possible, any need to cut or dig into the surface of the road (or the ground surface in the car park, etc) as part of the installation of the RFID readers. Therefore, it was realized (and it is considered) that another important design requirement, for the commercial viability of RFID readers for use in parking and other like applications, is for the RFID reader to be capable of permanent or semipermanent "on-road" installation—i.e. permanent or semipermanent installation directly onto the surface of the road or ground without the need to cut or dig into the road at all.

Referring now to FIG. 1, this Figure depicts (a portion of) quite a typical two-lane road, and on the outside of one of the lanes (the lane closest to view in the Figure) vehicle parking spaces are provided in an "end on end" arrangement (configured to accommodate "parallel parking" of vehicles). This kind of roadside parallel parking arrangement is extremely common. In FIG. 1, four parking spaces happen to be depicted, namely $PS_1$, $PS_2$, $PS_3$ and $PS_4$. A vehicle is depicted parked in parking space $PS_2$, but the other three depicted parking spaces are empty in FIG. 1. (It will be noted that, given the direction that the vehicle is pointing FIG. 1, it follows that FIG. 1 should probably be understood to depict a road in a jurisdiction where vehicles drive on the left-hand side of the road.)

FIG. 1 also depicts an arrangement where an RFID reader is provided on the line of the end boundary between adjacent parking spaces. Accordingly, there is an RFID reader $R_{1,2}$ located on the line of the end boundary between parking spaces $PS_1$ and $PS_2$, there is an RFID reader $R_{2,3}$ located on the line of the end boundary between parking spaces $PS_2$ and $PS_3$, etc. Each of the readers incorporates (in this embodiment the reader incorporates within it, as part of its structure) an antenna of the form discussed below.

FIG. 1 also schematically illustrates, for this embodiment, the required read zone for each of the depicted RFID readers. The required read zone for each reader is depicted in FIG. 1 as a region of three-dimensional space (shaded in green or gray in the Figure for visibility), essentially in the shape of a rectangular prism above the road surface and above each reader. Note that all other RFID readers used in the same application (e.g. any other readers located further along the road and therefore not depicted FIG. 1) would each have an identical required read zone.

Some (but not all) dimensions of the required read zone are given (labelled) for the read zone of reader $R_{2,3}$ in FIG. 1. Dimensions are not given on any of the other read zones (for other readers) depicted in FIG. 1; however, as mentioned above, those are the same (i.e. all of the readers, and hence their required read zones, are identical).

Figure 2:
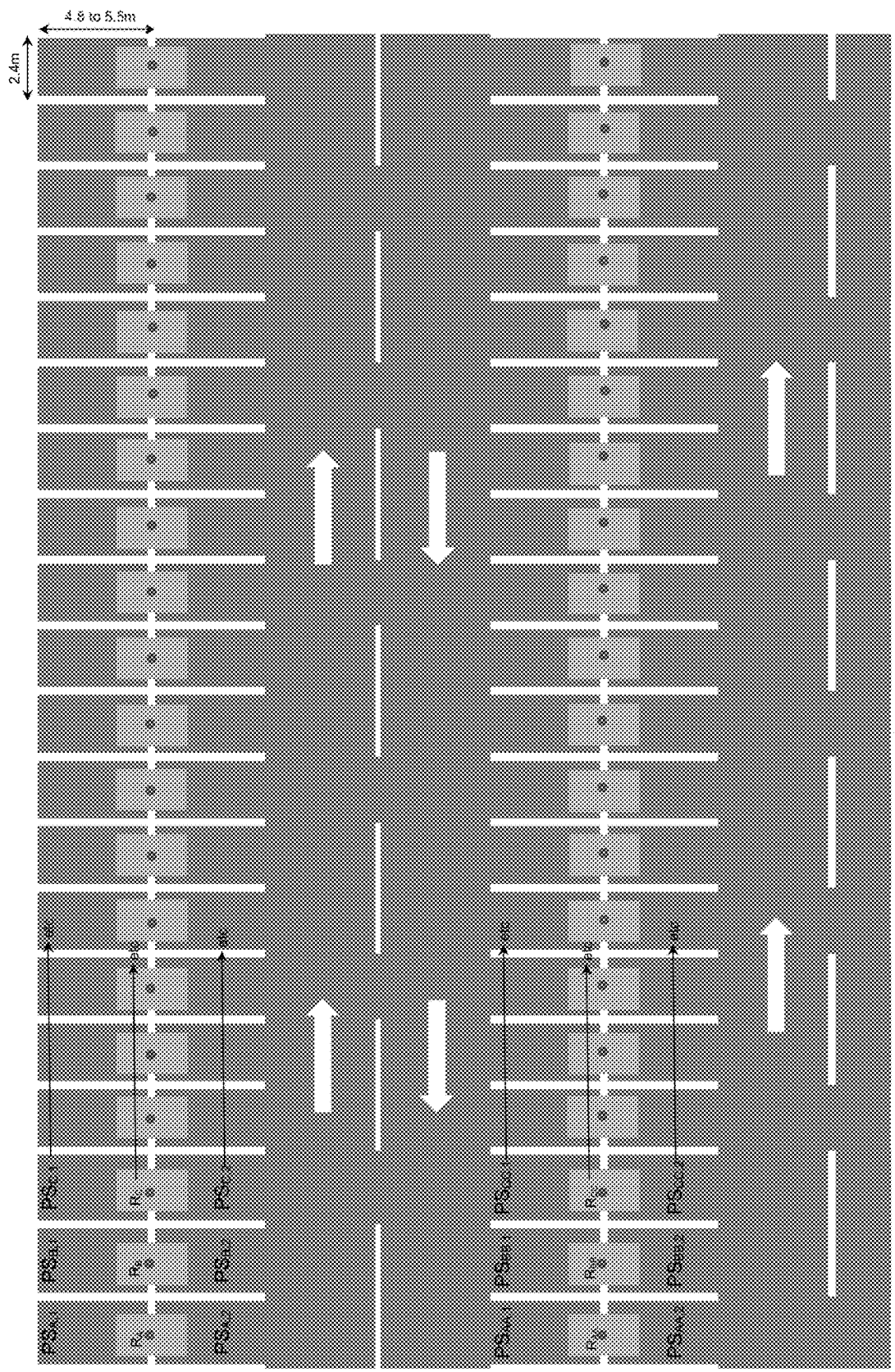
FIG. 2: Schematic illustration of the required read zone for each of many (identical) on-road RFID reader antennas to be used for vehicle detection and identification in a particular (non-limiting) angled parking or "carpark" application

At this point it is important to emphasise that the required read zone for the respective readers, as illustrated for three example readers FIG. 1, is the read zone that is thought to be required for RFID readers used in parking applications for vehicles such as conventional passenger cars, and other vehicles of this general size. In other words, parking applications where the vehicles are conventional cars, vans, SUVs, etc—i.e. vehicles of the sort and size that normally park in regular "car parks" or car parking spaces. Thus, the required read zone for the respective readers, as depicted in FIG. 1, is the read zone that is thought to be required for readers intended to be used for monitoring parking spaces in parking applications where these kinds of vehicles park. Therefore, the read zone of each of the readers in FIG. 1 is the read zone that readers should preferably have in order to be suitable for use in, say, the parallel parking application depicted in FIG. 1. The same read zone may (and should) also be equally applicable for use in other forms of passenger vehicle parking arrangements/configurations—i.e. where the same kinds of vehicles park, but where the vehicle parking spaces are arranged in a different configuration, like, say, in a grid like "angled parking" arrangement as depicted in FIG. 2—this kind of "angled parking" arrangement of vehicle spaces is extremely common in e.g. car parks found in shopping centres, airports, office buildings, hotels and the like.

However, it is to be noted (and this is alluded to above as well) that the invention is not necessarily limited in its application to RFID readers (and the antenna therefore) for use in parking applications for vehicles, and especially not only for vehicles of the particular type and size just described (although the invention can of course be used for this, and indeed the embodiments discussed in this Detailed Description section will be described further below mainly with reference to this). Embodiments of the invention could also be made to be used in, say, parking facilities where large trucks which are laden with one or more trailers (and which are hence very long) park end to end, and possibly also side by side. Such truck parking arrangements/configurations are quite common at "truck stops" and the like often found at locations along major highways in many countries. Also, as mentioned above, embodiments of the invention might also even be used in applications that are not vehicle related, such as e.g. logistics applications, say, for detecting and/or identifying RFID-tag-bearing shipping containers that are placed at specific placement locations on the ground in container storage yards or areas. Anyway, the point is that the present invention could very well also be used in such other applications (or other or analogous applications); however the particular required read zone (and its size) shown FIG. 1 likely would not be suitable for such other applications. This is because the required read zone for each reader depicted in FIG. 1, and in particular its size, shape and location relative to the reader, is set specifically so as to enable the reader to function as desired in parking (or perhaps gating) applications involving vehicles of the size of conventional cars and the like, as described above. If the invention were to be used in any of the other applications just mentioned, the size of the reader's required read zone, and possibly as a consequence also the relative dimensions and proportions of the antenna itself (discussed below) may need to be modified/changed (i.e. the configuration of the antenna may need to be different, with different dimensions and relative proportions (at least) compared to that discussed below).

In any case, returning to the discussion of RFID readers and their required read zones intended for use in vehicle parking applications for cars and the like (which is the context in which the embodiments discussed below will mainly be described), as shown in FIG. 1, the required read zone of each of the readers is about 3000 mm (3 m) long. The required read zone also extends about the same distance from the reader both forward and aft relative to the direction of vehicle travel on the road. Thus, the required read zone extends about 1500 mm (1.5 m) ahead, and about 1500 mm (1.5 m) behind, the reader. The required read zone also extends about the same distance to either side of the reader in the direction perpendicular to the direction of vehicle travel. The total width (in the said transverse direction) of the required read zone of each reader is about 2000 mm (2 m). Therefore, it follows that the read zone for each reader extends about 1000 mm (1 m) to the left, and about 1000 mm (1 m) to the right, relative to the reader. In terms of height (the dimension perpendicular to the surface of the ground/road) the required read zone of the reader does not actually begin at ground level (i.e. the required read zone does not actually touch the ground). Rather, the required read zone begins about 300 mm (0.3 m) above the surface of the ground/road, and it extends upward from there about 1000 mm (1 m). In other words, in the vertical direction, the read zone extends from about 300 mm to about 1300 mm above the road surface.

Importantly, the dimensions of the required read zone, and the location of the read zone relative to the reader, for RFID readers intended for use in this embodiment for these vehicle parking applications, as described in the previous paragraph, are not chosen at random. Rather, they are chosen/set for a number of specific reasons—see below. Having said this, it is not essential for the proper operation of the RFID reader for the required read zone dimensions, and the read zone's location, to be exactly as described in the previous paragraph. Some variation of this is possible without affecting to the reader's operability in these applications. This should become clearer from the discussion below.

In order to understand why, in this embodiment, the required read zone for each RFID reader extends (or should extend) about 1500 mm (1.5 m) ahead and about 1500 mm (1.5 m) behind the reader, relative to the direction of vehicle travel on the road, it should first be noted that, in most jurisdictions, the length of a vehicle parking space in "angled parking" configurations (like in FIG. 2) is around 4.8 m to 5.5 m, and the length of a vehicle parking space in parallel parking applications (like in FIG. 1) is around 6 m to 6.5 m.

Referring to parallel parking configurations, given the parking space length of about 6 m to 6.5 m, and also given that (as shown in FIG. 1) in parallel parking arrangements there will often be an RFID reader located on the parking space boundary at either end of each parking space, it follows that the required read zone for the reader at one end of the parking space extends about 1.5 m into the parking space from that end, and likewise the required read zone for the reader at the other end of the parking space extends about 1.5 m into the parking space from that other end. So, the required read zones of the respective RFID readers at either end of a given parallel parking space extend quite some distance (about 1.5 m) into the parking space; however neither RFID reader has a read zone that meets/touches or overlaps (or even comes close to doing so) with the read zone of the other RFID reader monitoring that same parking space. A gap of about 3-3.5 m (depending on the length of the parking space) remains in between the adjacent readers' read zones. This is important because the lack of any overlap between the required read zones of adjacent RFID readers helps to ensure that there is no interference or "crosstalk" between the readers which might otherwise result in vehicle-plate-RFID-tag read failures or other errors or operational performance reductions.

In addition to the above though, another important consideration is that most vehicles of the kind currently under consideration (i.e. the kinds of vehicles that park in the parking facilities in questions, like passenger cars, vans, SUVs, and the like) are around 3.6 to 5 m long. This too is important because, even if a vehicle in a parking space is, say, only 3.6 m long (i.e. a short vehicle), this is still longer than the distance between the read zones of the readers monitoring that space. Therefore, even for a vehicle which is as short as 3.6 m long (which few are), when that vehicle is parked in a parking space, provided the vehicle is parked correctly and centrally in the space (or approximately centrally) in the lengthwise direction, it follows that the front of the vehicle (and specifically the vehicle's front number plate—with its RFID tag) should be located within the read zone of the RFID reader at the forward end of the space, and likewise the rear of the vehicle (and specifically the vehicle's back number plate—with its RFID tag) should be located within the read zone of the RFID reader at the rearward end of the space. This means that, provided a vehicle is parked approximately centrally in the space (as generally required to allow room for other vehicles to manoeuvre in and out of adjacent spaces), the plate RFID tags on both the front and the rear of the vehicle will be able to be "read" by the RFID readers at the forward and rearward end, respectively, of the parking space.

In fact, even if a vehicle is short (say 3.6 m) and even if that vehicle is parked more towards the front end of the parking space, or more towards the rear end of the space (or perhaps even across the end boundary between two parking spaces), so long as the RFID tag on either the vehicle's front plate, or its rear plate, is within the read zone of one of the RFID readers, the said tag will still be read (even if the tag on the plate at the other end of the vehicle is not). So, even in the event of a poorly parked vehicle, at least one plate should be read and (assuming the plate "reads" correctly) the vehicle thereby identified. Thus, the only way a parked vehicle may avoid being detected/identified at all (assuming it is parked laterally within the side boundaries of the parking spaces) is if the vehicle is parked within a parking space but the vehicle short enough to fit entirely between the read zones of the RFID readers at either end of that space (i.e. so that neither of the tags on either of the plates at either end of the vehicle is within the region where it can be read by the relevant RFID reader). However, as mentioned above, depending on the length of the particular parking space, the space that exists between the read zones of the adjacent RFID readers that monitor a particular parallel parking space is generally about 3-3.5 m, but as very few cars are this short in practice, the likelihood that a car/vehicle will be capable of this is low. (And remember, even if a vehicle does happen to be short enough to technically fit in the gap between the read zones of the RFID readers that monitor a particular parallel parking space, such a vehicle will still be "read" (i.e. the tag on one of its number plates will be read and the vehicle thereby identified) provided the vehicle is parked slightly forward or aft within the space thereby bringing the front or back number plate within the read zone of the appropriate RFID reader.)

In any case, it will be understood from the above that the about 3000 mm length of the required read zone for one of the RFID readers, or about 1500 mm forward and aft from the reader, is not necessarily fixed—it could change or vary somewhat from this—provided the required read zone length is sufficient to operate as just described.

It should be noted at this point that, in parallel parking arrangements like in FIG. 1, if the presence of a vehicle is detected (e.g. by one RFID reader), but the vehicle's respective front and rear plate tags cannot both be read by the adjacent forward and aft RFID readers monitoring a particular single parking space, this may generate an alert (within the electronic parking management system or other system of which the RFID readers form apart) that something about the vehicle is untoward and potentially requiring further investigation. For example, it could be that the vehicle is incorrectly parked (e.g. parked too far forward or too far back within the space, or parked immediately on top of a single RFID reader across multiple spaces, or perhaps at an angle and/or far enough outside the side boundaries of the parking space to place one of the license plate tags outside the required read zone). In these cases, the system may alert e.g. a traffic warden or the like to investigate and potentially issue an infringement notice for incorrect parking. Alternatively, a read failure corresponding to one or both of the vehicle's tags could indicate damage to or malfunction of one of the plate tags. As a further alternative, even if a "read" can be obtained from the tags on both the front and the rear of the vehicle, if both tags do not read "correctly" (e.g. if both plates do not read as corresponding to the same vehicle), this too could indicate something untoward, for example it could be that one or both plates have been intentionally swapped in order to try and make the vehicle undetectable for enforcement purposes, etc.

Continuing to refer to the parallel parking scenario depicted in FIG. 1, the width of the required read zone, extending about 1000 mm to either side of a hypothetical centreline down the centre of the parking space (or about 2000 mm wide in total), is wide enough such that, even if a vehicle parked in a parking space is parked somewhat "off centre" (i.e. slightly closer to one side of the space than the other) within the space, and furthermore even if the location on the front and/or rear of the vehicle where the vehicle's RFID tag-bearing license plate is mounted is off centre on the vehicle (e.g. some European cars have a front license plate that is located more towards one side of the car than the other, and some 4WDs and other SUVs have the rear license plate mounted more to one side of the vehicle than the other, or possibly off-centre on the back of the vehicle's rear-mounted spare wheel), nevertheless the width of the required read zone is still such that (i.e. it is wide enough that) the said plate on the vehicle should still be located within the read zone (and hence readable by the RFID reader). It will therefore be understood that the about 2000 mm width of the required read zone, or about 1000 mm left and right from the reader, is not necessarily fixed—it too could change or vary somewhat from this—provided the required read zone width is sufficient to operate as just described.

Similar considerations apply to the vertical positioning and height of the required read zone—i.e. from 300 mm to 1300 mm above the surface of the road. Almost all vehicles, ranging from low-slung sports cars (with license plates mounted quite low to the ground) to 4WDs and SUVs (with license plates mounted quite high off the ground), will have their license plates mounted at a height within this range (i.e. between about 300 mm and about 1300 mm above the road surface). Accordingly, regardless of what type of vehicle it is and what height the license plate is mounted on the vehicle, the license plate should nevertheless be within the required read zone. Having said that, again, the required read zone height of about 300 mm to about 1300 mm above the road surface is not necessarily fixed—it could begin at a greater or lesser height above the ground surface, and its total height could also be greater or less—provided the range is sufficient that license plates (both front and rear license plates) on the range of vehicles (or most of them) likely to be required to be read are within the said height range.

It may be noted at this point that the width of the required read zone FIG. 1, which is about 2000 mm and centred within the width of the parking space, is less than the total width of the parking space, which is about 2400 mm (in FIG. 1 at least, although this is fairly typical). Accordingly, even at the respective end regions within a given parking space, which in the middle of the parking space are longitudinally within the required read zone, nevertheless on the outside edges at the ends of the parking space there is an about 200 mm wide gap on either side that is not covered by (i.e. it is not within) the required read zone. It was mentioned above that the width of the required read zone, namely the central (approx.) 2000 mm within the space, is wide enough that most (if not all) vehicles' license plates should be located within this region, even if the plates are mounted "off centre" on the vehicle. The question might be asked, why not extend the required read zone to cover the entire 2400 mm with the parking space?

The answer to this can be more readily understood when it is recognised that, preferably, an RFID reader with the same required read zone should also be able to be used in other parking arrangements, such as the angled parking arrangement depicted in FIG. 2.

As shown in FIG. 2, in angled parking arrangements such as this, a maximum of two spaces can be adjacent to each other "end to end" (e.g. $PS_{A,1}$-$PS_{A,2}$, $PS_{B,1}$-$PS_{B,2}$, and $PS_{AA,1}$-$PS_{AA,2}$, $PS_{BB,1}$-$PS_{BB,2}$, etc), but there are a large number of such "end to end" pairs stacked together immediately side-by-side one another (e.g. $PS_{A,1-2}$, $PS_{B,1-2}$, $PS_{C,1-2}$, and $PS_{AA,1-2}$, $PS_{BB,1-2}$, $PS_{CC,1-2}$, etc). In this general kind of arrangement, rather than having a pair of (i.e. two different) RFID readers monitoring a single parking space (such as with one reader on either end of the parking space as in FIG. 1) there is instead a single RFID reader monitoring the two separate parking spaces in each "end-to-end" pair. For instance, the single reader $R_A$ operates to monitor both parking space $PS_{A,1}$ and parking space $PS_{A,2}$. Likewise, the single reader $R_{BB}$ operates to monitor both parking space $PS_{BB,1}$ and parking space $PS_{BB,2}$.

With the foregoing in view, the reason why it is important for the width of the RFID reader's required read zone NOT to extend the full width of the parking space (e.g. 2400 mm in FIG. 1 and FIG. 2) is that, if this were to be the case, in angled parking arrangements like the one shown in FIG. 2, this could cause the required read zones of adjacent readers (e.g. like $R_A$ and $R_B$, or $R_{BB}$ and $R_{CC}$, etc) to overlap with one another (or come close to it), which could in turn give rise to potential for crosstalk, other forms of mutual signal transmission interference, etc. On the other hand, by ensuring that the required read zone for each RFID reader is less than the width of the parking space, and by ensuring that the readers are positioned substantially at or near the centre in between the long side boundaries in the respective parking spaces that they are monitoring, this insures that the potential for "crosstalk" between side-by-side RFID readers is minimised.

Notwithstanding what is said in the previous paragraph, similar to above, the size and shape of the required read zone is nevertheless such that, if a car pulls into a particular angled parking space (i.e. any parking space in FIG. 2), regardless of whether the vehicle drives forward "nose in" to the space or alternatively reverses "back in" to the space, provided the vehicle becomes correctly parked (and not across the boundaries or covering multiple spaces) one of the vehicle's license plates (the front plate if the vehicle went "nose in" or the rear plate if the vehicle went "back in") will be within the required read zone, and hence read by the reader.

At this point it is important to note that RFID signalling, as used in the kinds of applications currently under consideration, involves what might be described as "modulated radar" signalling methods/protocols/techniques. It is not necessary for present purposes to go into the full details of what these methods/protocols/techniques involve. However, it is useful to note that, it is possible (as mentioned above) for the presence of a vehicle (or the presence of a portion of the vehicle) that is located within the read zone of an RFID reader to be detected, even if that RFID reader is unable to obtain a "read" of an RFID tag on that vehicle (or perhaps if the vehicle does not have a tag, or the vehicle's tag is not located within the read zone). Having said this, in angled parking arrangements such as the one illustrated in FIG. 2, partly because of the low duty cycle at which the RFID reader operates (see below) and also due in part to the very low speed at which vehicles will generally be travelling as they move into or out of parking spaces (and indeed vehicles are actually completely stationary when parked in a parking space), it follows that if there is a vehicle located in (or moving slowly into or out of) only one of the two parking spaces that is being monitored by a single RFID reader, that RFID reader will be able to detect that there is presently a vehicle present in one (only one) of the parking spaces; however it may not be able to determine which one of those two parking spaces the vehicle is located in. Similarly (and again referring to parking arrangements such as the one illustrated in FIG. 2), if there is a vehicle located in (or slowly moving into or out of) both of the two parking spaces being monitored by a single RFID reader (or if a vehicle is parked/stationary in one and a vehicle is slowly moving into or out of the other), the RFID reader will be able to detect that there is presently a vehicle present in both parking spaces; however it may not be able to determine which vehicle is in which space. In either of these cases though, provided the RFID reader is able to correctly "read" the RFID tag on the vehicle or vehicles, the RFID reader (or the associated system) will be able to positively identify the vehicle, or both of the vehicles, even if it cannot tell which space the (or each) vehicle is in.

It will usually be slightly different in the case of parallel parking arrangements such as the one depicted in FIG. 1. This is because, in these kinds of parallel parking arrangements, each individual parking space is monitored by two different RFID readers, and as mentioned above it will normally be the case that when a vehicle is properly parked in a given parallel parking space, the RFID tag on the vehicle's front plate will be read by the RFID reader at the forward end of the parking space and the tag on the vehicle's rear license plate will be read by the RFID reader at the rearward end of the parking space. Accordingly, if a vehicle enters and moves properly into position in a single parallel parking space, the presence of that vehicle (at least) should generally/usually be detected by the two RFID readers monitoring space. And if the presence of a vehicle is simultaneously detected by the two separate RFID readers that are monitoring a single parking space, then naturally it can be concluded that there is a vehicle located in that space. Also, as mentioned above, both RFID readers (i.e. both of the readers monitoring a particular parking space) should also be able to "read" the RFID tags on the respective front and rear license plate of the said vehicle, and if both plates "read" correctly (i.e. both read as corresponding to the same vehicle, etc), then it may generally be concluded that nothing is untoward. On the other hand, as discussed above, if one of the plates does not read correctly (or does not read at all), or if both plates "read" but each reads as corresponding to a different vehicle (or the like), the heuristics of the system may operate to generate a signal or alert that something associated with the vehicle is untoward prompting further action to be taken (e.g. by a parking or law enforcement official, etc).

An explanation was given above for one reason why it is important for the width of the RFID reader's required read zone to be less than the with a vehicle parking space. This explanation was given with reference to the angled parking arrangement illustrated in FIG. 2. Basically, as explained above, it is important in angled parking for the required read zone of each RFID reader to be less than the width of the parking space, and for respective readers to be located on or near the centreline of the spaces that they are monitoring, so as to prevent "crosstalk" between adjacent RFID readers.

There is also another reason why it may be important for the width of the RFID reader's required read zone to be less than the width of the vehicle parking space, and this reason is more relevant in the context of parallel parking arrangements like the one depicted in FIG. 1. In the context of parallel parking, a reason why it may be important to ensure that the width of the RFID reader's required read zone is less than the width of the parking space (or perhaps it is more accurate to say that it is important to ensure that the RFID reader's required read zone does not extend beyond the boundaries of the parking space in the width/transverse direction) is because, whilst it is important for vehicles that are located within the parking space boundaries to be detected and their RFID tags read, it is also very important not to accidentally detect the presence of, or read the RFID tags on, vehicles which are simply passing by along the road adjacent to the parallel parking spaces. If the RFID tag on a vehicle that is simply passing by were to be accidentally read (by two adjacent RFID readers), it could be incorrectly concluded that that vehicle is parked in the parking space being monitored by those two readers, in which case a parking fee could be incorrectly imposed, or a parking fine incorrectly issued, or the like.

It was mentioned above that one of the important realisations that helped lead to the development of the present invention was that, because vehicles are moving at such comparatively low speeds (if not stationary) in the kinds of vehicle parking or gating (or other like) applications in which the present invention is likely to be used, the vehicle will consequently be within the antenna's "read zone" for a much greater period of time. And this in turn opens up a number of possibilities, including the possibility of using a lower (perhaps significantly lower) polling duty cycle. By way of indication (albeit without limitation) it is thought that in the kinds of parallel and angled vehicle parking applications currently being discussed with reference to FIG. 1 and FIG. 2 (and given the low speeds at which vehicles travel in these scenarios), a detection/identification pulse from the RFID reader's antenna every two seconds is should be sufficient, though this timing can of course be altered or optimised for different installations or applications. Where a detection/identification pulse frequency of once every two seconds is used, the detection/identification pulse could last, say, about 4 ms or less, thus resulting in a duty cycle of 0.2% or less (although again this is by way of indication only and without limitation). In any case, even if the specific pulse frequency and duration just described (and the consequent duty cycle) is treated only as a guide (although this is indeed thought to be at least representative of the kind of duty cycle that may be used with embodiments of the present invention), it will nevertheless be appreciated that such a low duty cycle may be beneficial in reducing power requirements and heat generation.

It was also mentioned above that one of the consequences of using a lower duty cycle, namely that the overall power consumption of the RFID reader may be significantly reduced, may also make the issue of delivering sufficient power to the RFID reader less challenging from a design point of view, and it may also open up additional possibilities for powering the RFID reader including, for example, using one or more solar panels on the RFID reader unit itself (either exclusively or as a supplement to some other power source) to provide power to the RFID reader. Such solar panel(s) (photovoltaic cells) may (although it/they need not necessarily or only) operate to charge a rechargeable battery or other rechargeable power storage device in or associated with the RFID reader. Thus, during hours of darkness or other periods of low light (or low solar radiation) the RFID reader may operate using power drawn from the rechargeable battery/power source. Of course, during daylight hours (or periods of solar radiation exposure) the RFID reader may also draw power from the rechargeable battery/power source (possibly at the same time as the rechargeable battery/power source is being charged by the solar panel(s)), although during daylight hours etc the RFID reader could also be powered directly from energy generated by the solar cells It is thought that there may often be a need to communicate wirelessly with the RFID reader, and where said wireless communication is in addition to, and separate from, the RFID communication between the RFID reader and vehicle-mounted RFID tags. For example, there may be a need for the RFID reader to be able to communicate wirelessly with a separate computer, or mobile device, etc, e.g. for the purpose of initial setup, or adjusting or altering some mode or manner of the reader's operation, or for diagnostics, or for obtaining data or information that may be stored on memory contained within the RFID reader, etc. In any case, these possible reasons why communication with the reader might be required are merely examples, and are not exhaustive. Having said this, in view of the desirability of minimising the power consumption of the RFID reader, it is thought that the method used for this wireless communication should also have low power consumption requirements. A number of low power wireless communication methods and technologies are available (e.g. Bluetooth is one example), and any such may be used.

Yet another point to be made is that, if the power consumption of the RFID reader is sufficiently low that it is possible for the reader to be powered exclusively by solar panels, which may be mounted on or part of the RFID reader itself, and also if the separate communication that may be required with the reader (e.g. for setup, diagnostics, etc) can be performed wirelessly, the consequence of this may be that there is no need for any cables (power or communication cables) connected to the RFID reader unit at all once it is installed. And this in turn may simplify the installation requirements for the reader, including potentially allowing the unit to be simply attached on the road surface without any need to cut, dig into or otherwise modify the road surface (except perhaps to apply an adhesive or the like for the attachment of the unit to the surface).

Another point to be made is that the RFID reader may be able to operate in (what might be described as) a number of "modes" including, in particular, a very low-power (vehicle) "detection" mode, and a higher-power (vehicle) "identification" mode. In the low-power detection mode, the RFID reader may use the antenna to continuously (or effectively continuously) transmit/emit a signal whose intended purpose is simply for use in detecting the presence of a vehicle by using a RADAR (or RADAR-like) methodology. RADAR methodologies essentially involve a radio (RF) signal that is first transmitted by a sensor, and that signal is then reflected by the object to be observed, and the reflected signal is received and interpreted by the sensor (e.g. for the purpose of detecting the presence of the object, and/or its location and/or movement relative to the sensor, etc). In the case of the present RFID application, when the reader is in the "detection" mode, a low-power signal may be continuously (or effectively continuously) emitted by the RFID reader (using the antenna), and that signal may then be "reflected" back to the reader by a vehicle when the vehicle is nearby or approaching, and upon receipt of such a reflected signal the RFID reader may thereby "detect" the presence of the vehicle. It is possible that the RFID reader may sometimes receive a signal reflected back by a vehicle even when the said vehicle is outside the RFID reader's required read zone. However, the point to make about this is that the required read zone (described above) is the region inside which the RFID reader is required to be able to communicate with a vehicle's plate-mounted RFID tag for the purpose of performing vehicle identification (not mere vehicle detection) if (or whenever) a vehicle's tag is within the said region. Therefore, it is possible that the RFID reader, when operating in the low-power "detection" mode, may sometimes detect the presence of a vehicle which is outside the reader's required read zone, even if that vehicle is not immediately "identified" (or perhaps not identified until/unless the vehicle moves into or within the required read zone).

It was mentioned above that, in addition to being able to operate in the low-power "detection" mode, the RFID reader may also be able to operate in a higher-power "identification" mode. In the high-power "identification mode", different radio equipment within the RFID reader may be used (or radio equipment may be used in a different way) compared to the equipment used (or the way it is used) in the low-power "detection" mode. Also the signal transmitted from the RFID reader, which in the "identification" mode is intended to facilitate/initiate "two-way" communication by way of modulated (information-carrying) signals exchanged between the RFID reader and RFID tag on a vehicle's license plate (and thus facilitate identification of the particular vehicle), is a MUCH higher power signal than is emitted by the RFID reader in the low-power "detection" mode.

The RFID reader may make use of the ability to operate in these two different modes described above (i.e. the "detection" mode and "identification" mode) to help minimise overall power consumption. This may be done in that the RFID reader operates normally/usually in the lower-power (and hence less power consuming) "detection" mode, and then switches to the higher-power (and more power consuming) "identification" mode (by switching on the RF communication equipment required for this, or switching the way the equipment is operated, as required) only when a vehicle is actually "detected" by the reader while in the "detection" mode. Hence, the RFID reader may switch into the more power-consuming "identification" mode only when the need for actual/positive vehicle identification is required (i.e. when the presence of a vehicle whose identity needs to be determined is detected). Once identification of the vehicle has been achieved, the reader may switch back into the low power detection mode—note that in the detection mode the reader will be able to detect the vehicle for so long as the vehicle remains (i.e. while it remains in the parking space or the like), and also when it leaves (this will be the point where the vehicle ceases to be detected by the reader). The reader can therefore remain in the low power detection mode until a vehicle is subsequently detected (this may be the same or a different vehicle—it will not be known until the vehicle is "identified").

Even if the RFID reader equipment is operating at a low duty cycle (as discussed elsewhere herein), nevertheless the fact that vehicles will generally be moving very slowly as they approach the RFID reader (and they may often even become completely stationary within the RFID reader's required read zone) in the applications presently under consideration means that, even at a low duty cycle, the RFID reader will be easily capable of detecting a vehicle, and then switching to the high-power "identification" mode in time, and with plenty of time, to complete a complete "read" to positively identify the vehicle by communication with the RFID tag on the vehicle's license plate.

In addition to saving power (which is particularly important e.g. where the RFID reader is powered exclusively by solar power and without any other external power source), only using the higher power level required for vehicle identification when this is necessary may also help to reduce heat generation and the risk of overheating in the RFID reader.

Figure 3:
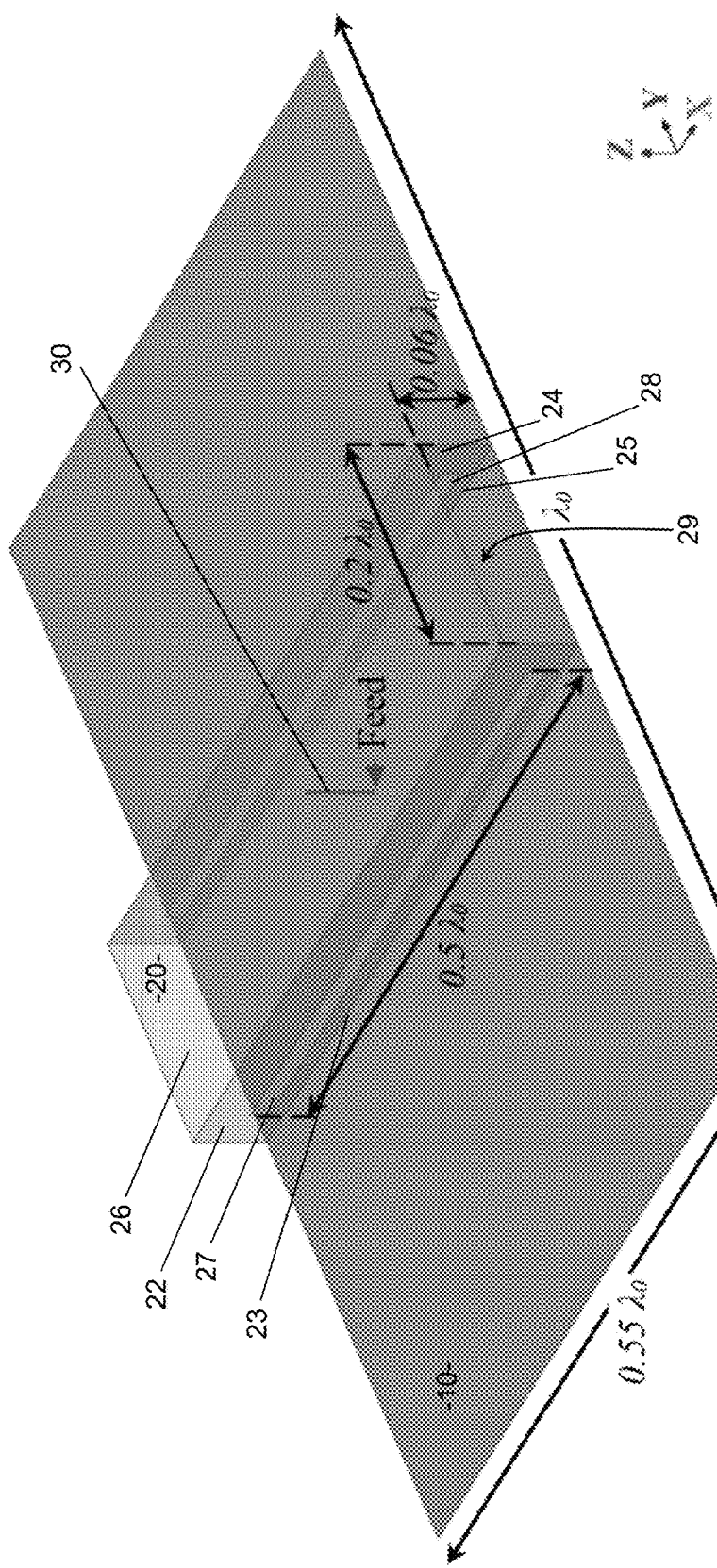
FIG. 3: Schematic illustration of the configuration and relative dimensions of the proposed antenna, with dimensions given as a function of signal wavelength

Turning to FIG. 3, this figure provides a schematic illustration of the configuration, and the relative dimensions, of one embodiment of the presently-proposed antenna. In other words, this is the configuration of an antenna which is thought to be capable of producing a radiation pattern (the shape/configuration/energy density distribution of) which in turn allows the RFID reader (of which the antenna forms part) to achieve the required read zone discussed in detail above, including with reference to FIG. 1 and FIG. 2. Thus, the radiation pattern produced by the an antenna in FIG. 3 is such that the antenna focusses/directs enough energy/power into the correct regions of space around (relative to) the antenna that the antenna (and its associated RFID reader electronics) are able to communicate with any plate tag that comes within the required read zone, such as the read zone described with reference to FIG. 1 and FIG. 2.

Figure 9:
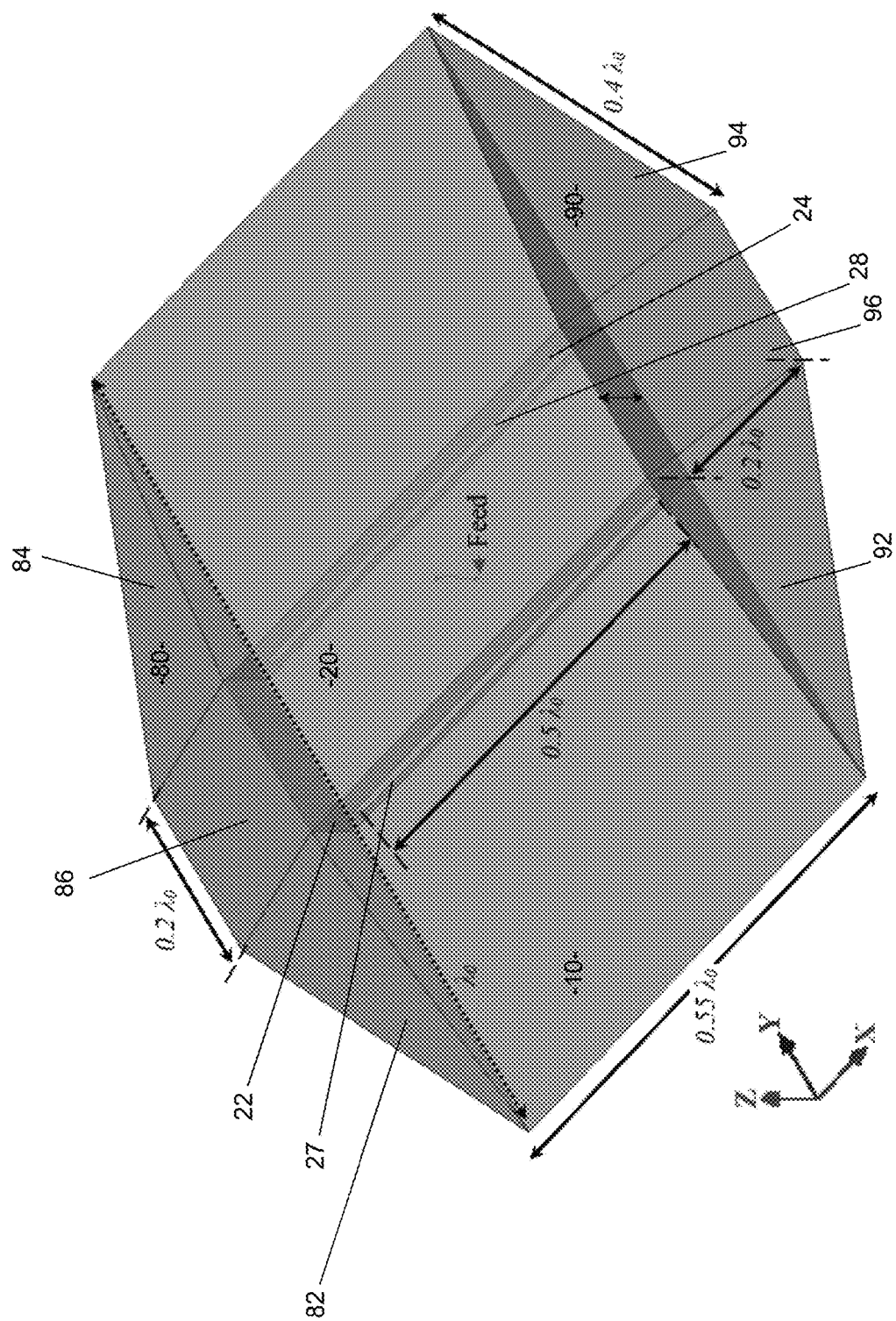
FIG. 9: Schematic configuration of the RFID reader's proposed surrounding and supporting structure for the antenna
Figure 10:
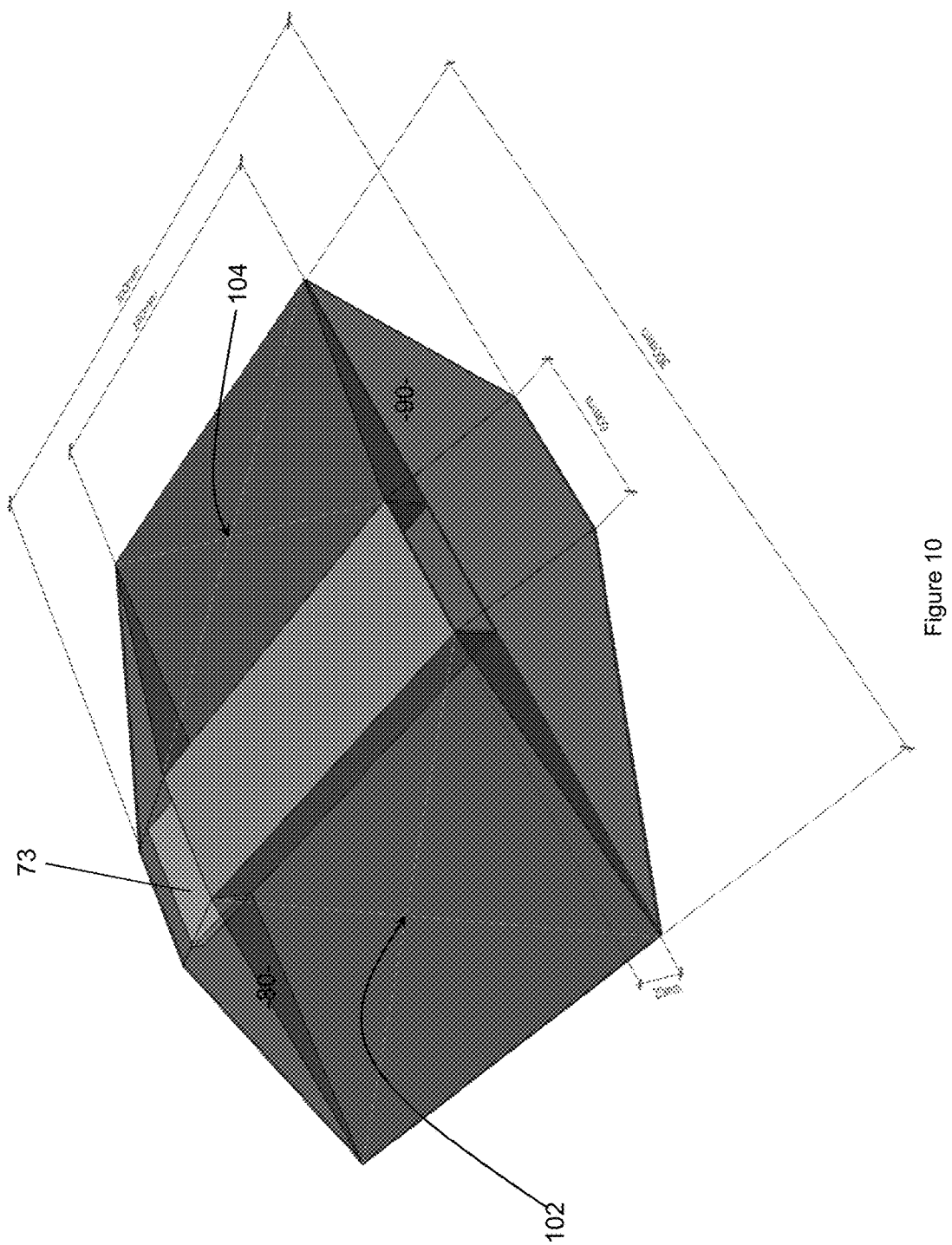
FIG. 10: Schematic configuration of the RFID reader's proposed surrounding and supporting structure for the antenna, with dimensions given in millimeters (assuming an antenna operating frequency of about 900-1000 MHz)

It is also useful to note at this point that FIG. 9 and FIG. 10 contain schematic illustrations of the configuration of the proposed surrounding and supporting structure that an (embodiment of an) RFID reader may provide for the proposed antenna in FIG. 3.

Note that, in FIG. 3, and also a number of the other Figures, the directions corresponding to what will be described as the antenna's X, Y and Z axes are depicted. However, in each of the Figures where the directions of the X, Y and Z axes are shown, the axes themselves are actually shown off to one side relative to the antenna. This is merely for illustrative purposes. In fact, the origin of (or the point of intersection between) the X, Y and Z axes is actually located in the plane of the antenna's ground plane, and at the geometric centre thereof. In other words, the origin of (or point of intersection between) the X, Y and Z axes is actually located, essentially, at the base of the antenna's feed pin 30, where the feed pin 30 connects with the ground plane 10. This will be readily understood with reference to the description given below.

It is to be clearly understood that the antenna in the embodiment schematically illustrated in FIG. 3 is a novel and highly advantageous design suitable for use in a low profile RFID reader antenna used in RFID communication in the UHF band. And it is to be stressed that the antenna in FIG. 3 has a low profile. In other words, when the antenna (or the RFID reader containing the antenna) is placed/installed on the road or ground surface, the whole of the antenna (and likewise the associated RFID structure) remains low to the ground and does not project or "stick up" high above the ground. This is important because, given the use to which the antenna is to be placed (with vehicles driving in and around and even directly over the top of the antenna/reader), if the antenna were to stick up high above the ground it would almost certainly be quickly damaged or destroyed through collision with a vehicle, not to mention also creating a danger and potential for accident and/or injury to both vehicles and persons.

Another point to stress is that creating an RFID reader antenna that has a low profile but which is also able to provide a radiation pattern suitable for road-going-vehicle detection and identification has in the past proven extremely difficult. This is discussed further in the earlier patent applications discussed above. In any case, the antenna in the embodiment schematically illustrated in FIG. 3 is able (it is thought) to achieve these things, and in relation to the requirement for the antenna to have a low profile, the overall height of the antenna in FIG. 3 (and of the RFID reader as shown in FIG. 9) is no more than about 25 mm. This maximum height (about 25 mm) is the same as the height of a typical cat-eye ("cat-eye" is the general name usually used to refer to the kind of raised, but low profile, retro-reflective road marker commonly used on public roads). Limiting the height of the antenna, and the associated RFID reader, to no more than about 25 mm should help to ensure that vehicles may roll easily over the reader, without damage to the reader or the vehicle. The angle of attack (i.e. the angle of slope of the sides) on the sides of the RFID reader structure should be low (preferably no steeper than 45°)—this is mainly to reduce humans tripping over the unit.

The antenna in FIG. 3 has a structure comprising a ground portion 10 and a radiating component 20. The radiating component has a first side 22, and a second side 24 that is spaced apart from the first side 22. The first side 22 has a ground edge portion 23 which is in contact with the ground portion 10, and the first side 22 extends, from its ground edge portion 23, away (upward) from a surface (i.e. the surface of the ground portion 10) on one side (the upper side) of the ground portion 10. The second side 24 also has a ground edge portion 25 which is in contact with the ground portion 10, and the second side 24 also extends, from its ground edge portion 25, away (upward) from (in this case) the single/same surface on the upper side of the ground portion 10. The radiating component also has a joining portion 26 which is spaced apart from the ground portion 10 on said one side (the upper side) of the ground portion 10, and the joining portion 26 extends between the first side 22 and the second side 24, such that there is a region of space 29 defined between the first side 22 and the second side 24 and between the joining portion 26 and the ground portion 10. In this embodiment, both the first side 22 and the second side 24 have a slot therein. These slots are labelled 27 and 28 respectively.

It can also be seen in FIG. 3 that, in this embodiment, the antenna's ground portion 10 is substantially flat/planar and rectangular, such that it might be referred to as a (rectangular) ground plane 10. The radiating component 20 might also be referred to as a top radiator. Thus, expressed in these terms, the antenna in the embodiment in FIG. 3 has a flat ground plane 10 and box shaped top radiator 20. The two slots 27 and 28 in the respective sides of the top radiator 20 extend along for almost the entire length of the top radiator 20 on either side. And because the top radiator 20 extends substantially across the entire width of the ground plane 10 (and hence the entire width of the antenna), accordingly the respective slots 27 and 28 also extend across almost the entire width of the antenna. It is anticipated that the top radiator 20 will often be soldered to the ground plane 10. The two ends of the box shaped top radiator 20 are open—i.e. what would otherwise be the "faces" of the box shape that lie along the long edges of the antenna are missing/absent (or at least there are no conductive or radiative antenna elements located in or across or covering either of these ends of the open box shaped cavity within the radiator 20). The radiator 20 is fed from the ground plane 10 at the centre position with the help of a feeding pin 30 whose length is essentially the height of the antenna. In other words, the feed pin 30 is oriented perpendicularly to the ground plane 10 and it extends between and connects the ground plane 10 and the underside of the joining portion 26 of the radiator 20 half way along the length of the radiator 20 and half way between the first side 22 and the second side 24.

The fact that the antenna is vertically polarized is important because the antenna needs to be able to communicate with the RFID tags on vehicle license plates, and it is thought (or expected) that the RFID tags on vehicle license plates will also be vertically polarised (i.e. they will produce vertically polarised radiation). This is due to the kinds of antenna likely to be used by the RFID tags on vehicle license plates (such as patch antennas, although a range of other types of antennas may be used by the RFID tags on vehicle license plates). The beam shape of the RFID tags on vehicle license plates will also (it is thought) point (or the direction of max gain of the radiation pattern of the antenna of the RFID tag on vehicle plates will point) directly away from the vehicle (or perpendicular to the plane of the license plate). Again, this is due to the kinds of antenna likely to be used by the RFID tags on vehicle license plates. As mentioned above, the fact that the antenna emits energy in the form of electromagnetic waves that are vertically polarised is thought to be advantageous because electromagnetic waves which are vertically polarised propagate better when radiated from a ground plane than electromagnetic waves that are horizontally polarised.

Referring again to FIG. 3, the slots 27 and 28 in the sides of the radiator 20 are both around $0.5\lambda_0$ in length, where $\lambda_0$ denotes the free space wavelength of the centre frequency used by the antenna. The total width of the antenna is slightly greater than this, at around $0.55\lambda_0$. However, it is to be noted that, with the slots 27 and 28 set at or about around $0.5\lambda_0$, the width of the antenna may still be increased further, if required, without significantly changing the antenna performance. The height of the top radiator 20—i.e. the vertical distance between the ground plane 10 and the joining portion 26 (ignoring the thickness of the material used particularly in the radiator 20 which is very thin and therefore negligible)—is around $0.06\lambda_0$. The width of the top radiator 20 (i.e. its dimension in the antenna's overall lengthwise direction) is about $0.2\lambda_0$, which means that the slots 27 and 28 are both $0.1\lambda_0$ away from the feeding pin 30 in the antenna's lengthwise direction. It is thought that this distance may help the antenna to effectively resonate and also provide high impedance matching. The ground plane 10, and hence the antenna overall, has a length of about $\lambda_0$, although this can be shortened through optimization.

Figure 4:
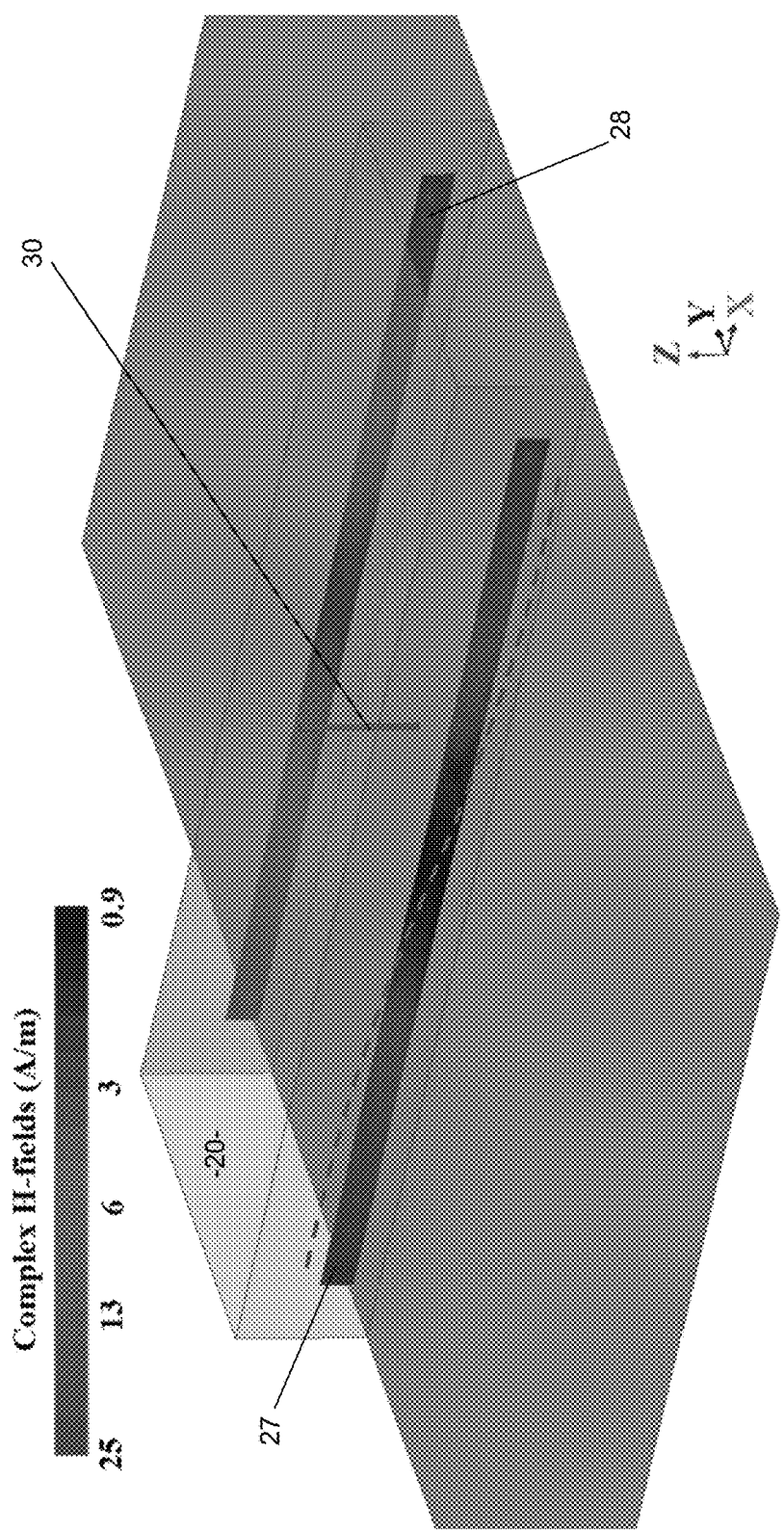
FIG. 4: Graphical representation of the complex magnetic fields (H-fields) in the slots of the proposed antenna

It is useful at this point to briefly consider the operation of the antenna, and in particular the operation of the antenna's top radiator 20. Let us begin by examining the magnetic field distributions in the slots 27 and 28 in the two opposing side faces 22 and 24 of the top radiator 20, when the antenna is "on" (i.e. radiating RF energy). As can be seen from FIG. 4 (and from the graphical representation it contains of the complex magnetic fields within the slots 27 and 28), when the antenna is "on" (which is what FIG. 4 depicts), each of the slots is essentially (i.e. they both operate as) a half-wave radiator, with both of them being excited by a single feeding (the single feed pin 30). The fact that both slots operate as (or similar to) a half wave radiator is evident from the depicted magnetic filed strength distribution shown in each of the slots. Note that the colour distributions in FIG. 4 only indicate the magnitude of the magnetic filed strength in each slot. However, the relative polarity is represented in FIG. 4 by the dashed line superimposed over slot 27, and as can be seen, the shape of this dashed line corresponds to the shape of half a sinusoidal waveform—so half the wavelength of the signal—thus indicating that the slot 27 operates as a half wave radiator, and it is the same for slot 28.

Turning now to the "radiator box" which is created by the overall configuration of the top radiator 20, this radiator box (i.e. the top radiator 20) functions (at least somewhat) in the manor of a (electromagnetic) cavity resonator. What a cavity resonator is, and generally how they work/operate, is well understood in the field of electronics and antenna design. However, for the purposes of brief explanation here, it is stated in Wikipedia (https://en.wikipedia.org/wiki/Resonator) that

[a] cavity resonator is a hollow closed conductor such as a metal box or a cavity within a metal block, containing electromagnetic waves (radio waves) reflecting back and forth between the cavity's walls. When a source of radio waves at one of the cavity's resonant frequencies is applied, the oppositely-moving waves form standing waves, and the cavity stores electromagnetic energy . . . . [C]avity resonators are only used at microwave frequencies and above, where wavelengths are short enough that the cavity is conveniently small in size.

Due to the low resistance of their conductive walls, cavity resonators have very high Q factors; that is their bandwidth, the range of frequencies around the resonant frequency at which they will resonate, is very narrow. Thus they can act as narrow bandpass filters. Their resonant frequency can be tuned by moving one of the walls of the cavity in or out, changing its size.

Whilst the above quote from Wikipedia describes what a cavity resonator is, and how they work, the above quote does so only in the very simplest of terms, and it is also to be recalled that the top radiator 20 in the antenna presently being considered here is not actually (or merely) a conventional/pure cavity resonator. For instance, the top radiator 20 is open ended at either end (see above), not fully enclosed like conventional cavity resonators, and the top radiator 20 also incorporates other openings in the form of the slots 27 and 28 along its respective long sides—these particularly have a significant impact on the overall radiative properties of the top radiator 20 vis-à-vis a conventional cavity resonator.

Nevertheless, it is thought to be generally accurate to say (as was stated above) that the radiator box (i.e. the top radiator 20) in the present antenna functions in at least something like the manor of a cavity resonator. However, it must also be borne in mind that, for reasons discussed above, the top radiator 20 (and indeed the antenna overall) must have a low profile (i.e. a low physical height). This is significant because it is actually very difficult to design a cavity resonator (or an antenna incorporating a cavity resonator) which has a low profile (low physical height) and which also provides good impedance matching.

Impedance matching (i.e. what this is, and why it is important) is also well understood in the fields of antenna design and electronics generally. Speaking in very general terms, in the present context, impedance matching is essentially about making two impedances, like (a) the impedance of a transmitting antenna and (b) the output impedance of the signal transmitter (or its amplifier) that supplies the signal (as an electrical current) to the transmitting antenna, match. The reason why matching these impedances is important is because if the impedances do not match, none of (or very little of) the power generated by the signal transmitter (or its amplifier) will be delivered to the antenna, and therefore no energy (or very little energy) will be transmitted by the antenna. For instance, at very low signal frequencies, if the impedance of the antenna is much smaller than the output impedance of the transmitter, little or no energy will be transmitted by the antenna, but equally (and recalling that we are talking about low frequencies), if the impedance of the antenna is much larger than the output impedance of the transmitter, again, little or no energy will be transmitted by the antenna.

There is actually considerably more to impedance matching than the previous paragraph might suggest. For one thing, impedance is an inherently complex quantity (i.e. having real and imaginary components), given that impedance relates current to voltage in an antenna and current has both magnitude (real component) and phase (imaginary component). Therefore, even for the comparatively simple case of very low frequencies mentioned above, impedance matching does not simply involve setting the impedance of the antenna to be equal to the output impedance of the transmitter. Rather, at low frequencies, the antenna impedance and the transmitter output impedance will generally be matched if one is set as (or about) the complex conjugate of the other. The situation is even more complicated for high signal frequencies, basically, because at high frequencies the lengths of the wires and other connectors that connect things become a significant fraction of signal wavelength, and this complicates matters further. Even so (i.e. even at high frequencies where things are more complicated than they are at low frequencies—and the present invention operates at high frequencies) the basic premise remains the same, namely that the purpose of impedance matching is (in terms of the example above) to ensure that the output impedance of the transmitter and the antenna impedance are set (or so that one is set relative to the other) in a manner that maximises the power delivered to, and radiated by, the antenna. If the impedances are not well "matched", not very much power will be delivered to, or radiated by, the antenna, and power instead ends up being reflected back to the transmitter (which can be a problem in itself if high power is generated). This loss of power is sometimes quantified by reference to quantities such as "return loss" and impedance "mismatch loss".

An indication of how well matched an antenna is to its transmitter can be gleaned from a quantity known as the voltage standing wave ratio (VSWR). As mentioned above, if the transmitter output impedance and the antenna impedance are not matched, part of the power generated by the transmitter will be reflected back from (and not delivered to) the antenna. More specifically, this reflected part of the power (i.e. the reflected signal portion) has both magnitude and phase, and this gives rise to addition and subtraction (constructive and destructive interference) with the incident power signal being sent by the transmitter to the antenna, and this addition and subtraction (constructive and destructive interference) between the incident signal and the reflected signal in turn gives rise to a voltage standing wave pattern, in this case between the transmitter and the antenna. The ratio of the maximum to minimum voltage amplitude in this standing wave pattern is the voltage standing wave ratio (VSWR).

A related quantity is the above mentioned quantity, return loss. Return loss is a measure (in dB) of the ratio of the power in the incident signal to that in the reflected signal, and as defined it is always positive. By way of example, if the matching between a transmitter and its antenna achieves a 10 dB return loss, this means that 1/10 (or 10%) of the incident power is reflected. Note: the higher the return loss, the less power is actually lost.

Another related quantity is the above-mentioned quantity, mismatch loss. Mismatch loss is a measure of how much the transmitted power is attenuated due to the reflection. By way of example, an antenna with a VSWR of 2 would have a reflection coefficient of 0.333, a mismatch loss of 0.51 dB, and a return loss of 9.54 dB (meaning approximately 11% of the transmitter power is reflected back).

Referring again to VSWR, as defined, this is a real number that is always greater than one. A VSWR of 1 indicates no mismatch loss (and also no return loss, meaning the antenna is perfectly matched to the transmitter). Higher VSWR values indicate greater mismatch loss and lower return loss. In another example, a VSWR of 3.0 indicates about 75% of the power is delivered to the antenna (i.e. 1.25 dB mismatch loss, 6.0 dB return loss, and about 25% of the transmitted power is lost). In a further example, a VSWR of 5.0 indicates about 44% of the power is lost (i.e. 2.55 dB mismatch loss and a 3.5 dB return loss.

Incidentally, typical antenna matching achieves a return loss of approximately 10 dB (equivalent to a VSWR of approximately 2). However, for RFID, and especially in the difficult on-road/ground placement presently being considered, a VSWR better than 1.25 (equivalent to a return loss of approximately 19-20 dB) is thought to be desired for the signal frequency band (i.e. the antenna's operational signal frequency band) of interest.

It is to be clearly noted that the above discussion of impedance matching, and the various measures and quantities associated with this, is not a complete or comprehensive explanation of the topic of impedance matching, etc (far from it). Rather, the above discussion is provided merely to emphasise the importance that impedance matching plays in antenna design. With this in mind, it is now useful to repeat what was mentioned above, namely that it is very difficult to design a cavity resonator antenna having a low profile (low physical height) and which also provides good impedance matching. The significance of this may now be more fully understood. (Basically, the antenna has to have a low profile, for reasons explained above, but it must also provide or allow for good impedance matching, also for reasons described above. However, heretofore, achieving both of these two requirements together/at the same time/in the same antenna has proven extremely difficult to achieve.) Furthermore, in light of this, those skilled in the art will understand that, in order for an antenna of the type discussed herein to be implemented in any practical/realistic application, optimisation of the antenna may be (typically would-be) required.

Figure 5:
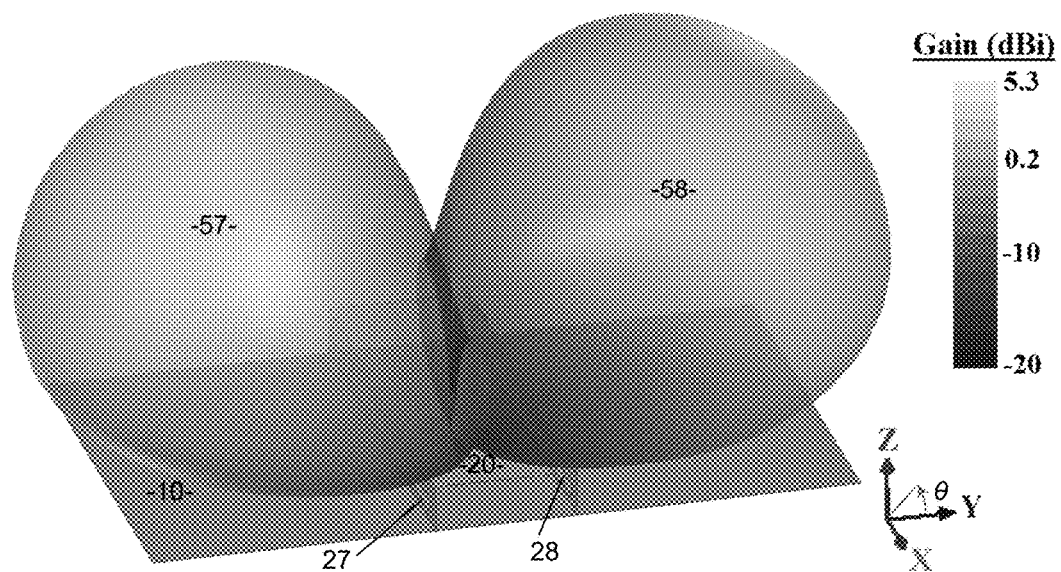
FIG. 5: 3-D representation of the theoretical (ideal) radiation pattern shape for the proposed antenna

Turning now to FIG. 5, it should be noted initially that, in FIG. 5 (and the same also applies to FIG. 7), only one side (the outside) of each of the slots 27 and 28 is effectively radiating. Radiation is thus produced (i.e. the RF energy produced by the antenna carrying the signal is produced) and it "comes out" of the cavity resonator from the sides 22 and 24, creating the bidirectional radiation pattern depicted in FIG. 5. It is also to be noted that the resonating frequencies of the antenna are defined by the dimensions (particularly the dimensions of the top radiator 20) described above with reference to FIG. 3. Impedance matching of the antenna can be improved by adjusting the slot width of slots 27 and 28 (i.e. how wide the respective slots are in the vertical direction), the slot position (i.e. how far up the respective sides 22, 24 the slots are located, or in other words how high above the ground plane 10 they are) and especially by adjusting the feeding pin radius. The general antenna configuration described above (i.e. with the particular dimensions described above) can be applied for use in, for example, the 866 MHz and 900 MHz RFID bands. Because the signal frequencies used for RFID communication differ between different countries or jurisdictions though, and also because the RF operating/signal propagation environment will differ greatly between different locations (especially due to things like road humidity, road conductivity and other location- or environment-specific conditions which can vary widely), slight variation/alteration of the particular antenna geometry given above might be needed (for the purposes of antenna optimisation, or for tuning for a particular operating frequency) depending on the situation.

Figure 6:
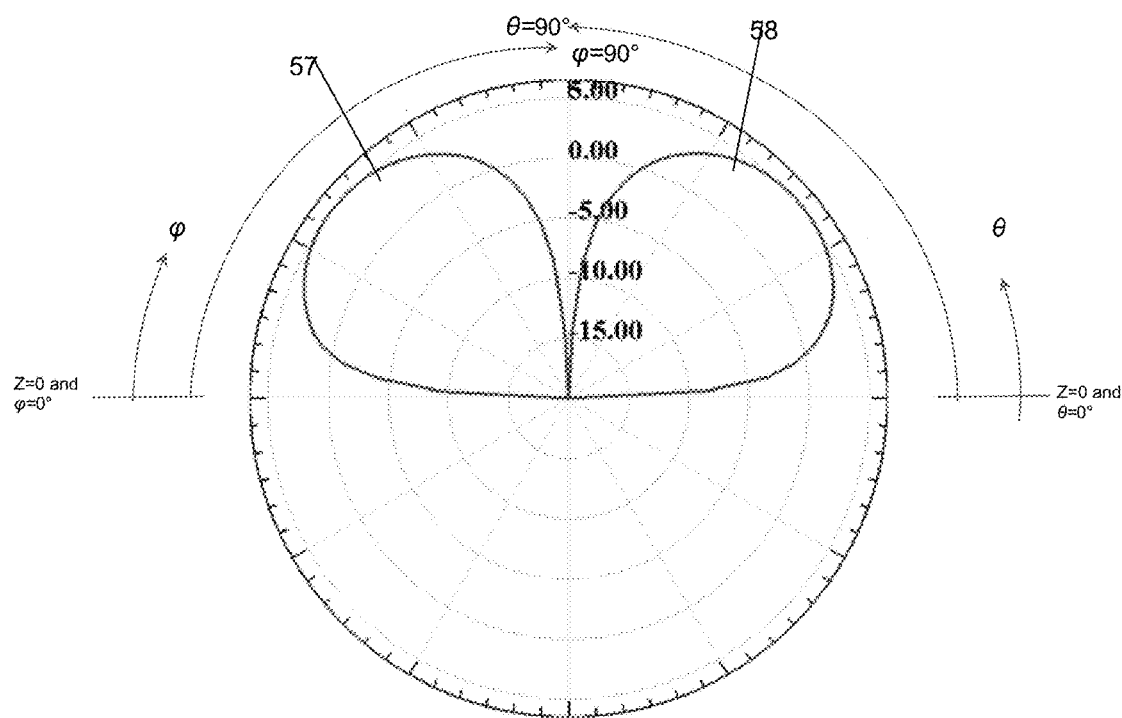
FIG. 6: 2-D representation of the theoretical (ideal) radiation pattern shape for the proposed antenna in the antenna's central Y-Z plane

FIG. 5 and FIG. 6 illustrate the radiation pattern produced by the antenna in FIG. 3 in 3D, and in the Y-Z-plane, respectively, at a signal frequency of 920 MHz. Likewise, FIG. 7 and FIG. 8 also illustrate the radiation pattern produced by the antenna in FIG. 3 in 3D, and in the Y-Z-plane, respectively, at the same frequency. The reason the radiation pattern depicted in FIG. 7 and FIG. 8 differs from that in FIG. 5 and FIG. 6 will be explained below.

Before explaining this difference though, it is important to note that in FIG. 5 (and the same also applies to FIG. 7), the antenna and it's radiation pattern are not shown "to scale" relative to one another. Actually, what is meant by the "size" and "shape" of the antenna's radiation pattern is discussed further below. However, if viewed in isolation (and not in the context of this accompanying description), it might otherwise initially seem from FIG. 5 (and also from FIG. 7) that the antenna's radiation pattern only extends a short distance beyond the boundary of the antenna's base plate 10. Hence it might be thought that the read zone formed by the antenna's radiation pattern also only extends slightly beyond the boundary of the antenna's base plate. This is certainly not the case. On the contrary, the size/extent of the antenna's radiation pattern is such that the read zone it gives rise to is of the size described above, for example with reference to FIG. 1 and FIG. 2. Therefore, it should be clearly understood that FIG. 5 (and FIG. 7) depict the basic shape of the antenna's radiation pattern, and also the orientation of the radiation pattern relative to the antenna and its various components; however the actual size with which the radiation pattern is depicted relative to the antenna (i.e. relative to the antenna's base plate 10 and top radiator 20) in these Figures is not representative of the true size/extent of the radiation pattern relative to the size of the antenna.

FIG. 5 and FIG. 6 both illustrate an "ideal" radiation pattern of the antenna in FIG. 3 (i.e. the radiation pattern of the antenna described above based on a number of "idealised" assumptions). For instance, FIG. 5 and FIG. 6 illustrate the radiation pattern of the antenna in FIG. 3 assuming an infinite, ideal road condition and a perfectly reflective ground plane. It can be seen from FIG. 5 and FIG. 6 that, with these assumptions, the antenna has (or can be modelled to have) a bi-directional radiation pattern comprising two opposing, quite round and smooth "lobes" 57 and 58, each with a peak gain of 5.3 dBi at 40° elevation above the ground plane (i.e. peak gain of 5.3 dBi at $\theta=40°$ for the lobe 58 and peak gain of 5.3 dBi at $\varphi=40°$ for the other lobe 57). This angle of elevation of the peak gain in each of the lobes in the antenna's radiation pattern is thought to be precisely (or very close to) what is desirable for vehicle identification purposes, because it means that the antenna is directing energy upwards at an angle (or focusing energy mostly upwards within an angle range, given that the 3 dB beamwidth within the respective lobes in FIG. 5 and FIG. 6 is approximately $\theta=15°$ to 65° and $\varphi=15°$ to 65°) that focuses energy in the general direction required to read vehicle license plates most effectively.

In the "ideal" radiation pattern in FIG. 5 and FIG. 6, there is also a radiation null in the plane of Y=0 (in other words in the X-Z plane). In the "ideal" radiation pattern in FIG. 5 and FIG. 6, there are also radiation nulls at 0° elevation above the ground plane (i.e. there are nulls along the ground plane, at $\theta=0°$ and $\varphi=0°$, or in other words there is a radiation null corresponding to the plane of Z=0 i.e. the X-Y plane). However, the various radiation nulls just described (i.e. their existence or the location thereof relative to the antenna, etc), it is thought, may not be completely realistic (i.e. not completely representative of a real-life scenario).

Figure 7:
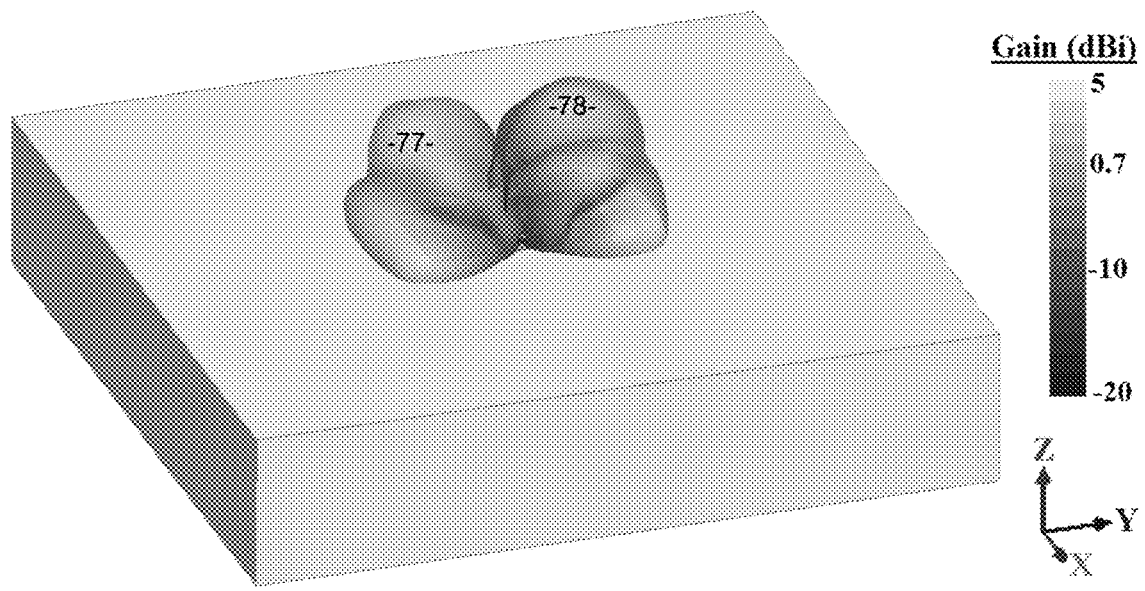
FIG. 7: 3-D representation of an experimentally measured radiation pattern shape for a prototype of the proposed antenna
Figure 8:
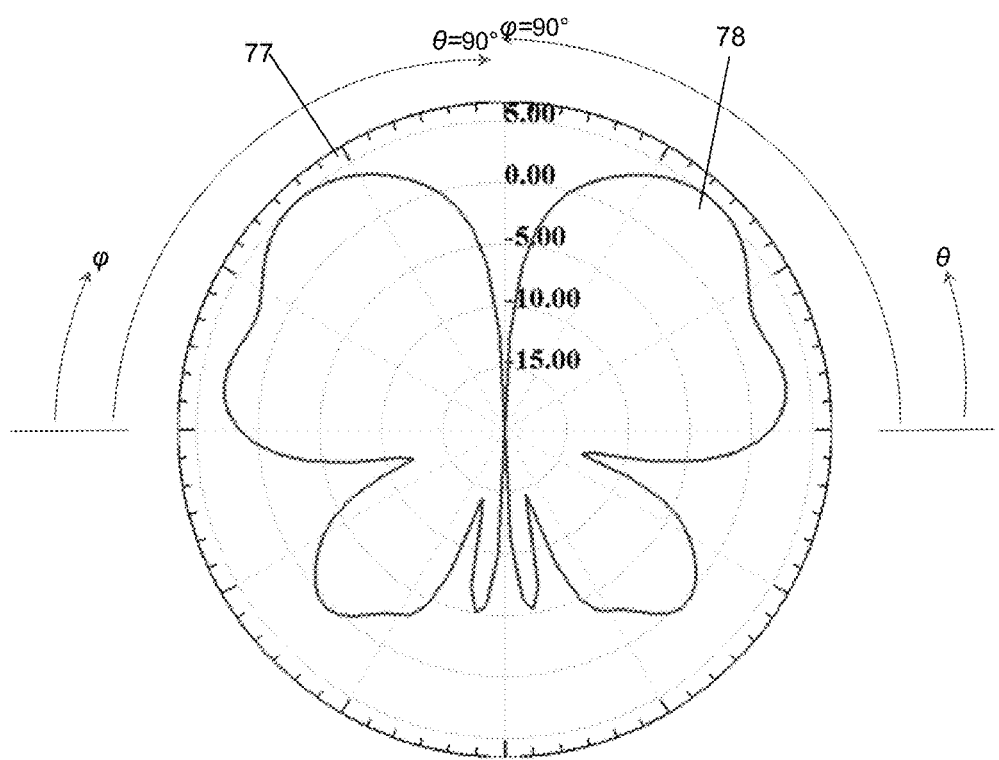
FIG. 8: 2-D representation of the experimentally measured radiation pattern for a prototype of the proposed antenna in the antenna's central Y-Z plane

Therefore, what is thought to be a somewhat more realistic representation of the antenna (i.e. based on somewhat more realistic operating conditions and/or less idealized assumptions) has been examined/modelled, and representations of the radiation pattern produced by this are shown in FIG. 7 and FIG. 8. The examined/modelled antenna, whose radiation pattern is represented in FIG. 7 and FIG. 8, is mounted (or it is modelled as if mounted) on a 600 mm×600 mm "slab" of road. This is thought to be (or to represent) a much more realistic operating environment for the antenna. Compared to the idealised antenna model (and radiation pattern representations) in FIG. 5 and FIG. 6 above, the difference or change in the antenna's reflection coefficient in the more realistic antenna (and it's radiation pattern representations) in FIG. 7 and FIG. 8 is actually quite small and insignificant. However, moving from the idealised to the more realistic antenna, there are quite notable changes in the shape and configuration of the antenna's radiation pattern. Note that, unlike the lobes 57 and 58 of the radiation pattern of the idealised antenna, which each have a quite smooth/clean and rounded shape, the respective lobes or "sides" 77 and 78 of the radiation pattern of the more realistic antenna both have a less even and more lumpy shape. The difference in the shape and configuration of the radiation pattern, and of the sides or lobes thereof, is particularly noticeable and significant along the lines of 0° elevation angle (i.e. along the ground plane at or around $\theta=0°$ and $\varphi=0°$). Indeed, as shown in FIG. 7 and FIG. 8, in the more realistic antenna, the radiation pattern does not have radiation nulls directly along the ground plane at $\theta=0°$ and $\varphi=0°$ (as was the case in the radiation pattern of the idealised antenna). Rather, along the ground plane (i.e. at $\theta=0°$ and $\varphi=0°$) is actually one of the angles/directions of elevation of quite high gain in the more realistic antenna radiation pattern (it is not the angle of elevation of maximum gain, but it is still one of the angles of elevation of comparatively large gain in the antenna's overall radiation pattern). In terms of radiation nulls, in the more realistic antenna radiation pattern, the radiation nulls (or the portions of the radiation pattern that more closely approximate nulls) are rotated approximately 15° downward in comparison, or in other words to about $\theta=-15°$ and $\varphi=-15°$. The fact that $\theta=0°$ and $\varphi=0°$ are angles of elevation of quite high gain in the more realistic antenna radiation pattern, and that the radiation nulls (or the portions of the radiation pattern that approximate nulls) are located at about $\theta=-15°$ and $\varphi=-15°$, indicate that there is penetration of the electromagnetic waves/radiation produced by the antenna into the road. Perhaps more importantly, in the more realistic antenna radiation pattern, the radiation pattern's 3 dB beamwidth extends from about $\theta=0°$ (or just above 0°) and $\varphi=0°$ (or just above 0°) to about $\theta=60°$ and $\varphi=60°$. Furthermore, the angle of elevation of maximum gain in the realistic antenna radiation pattern is at about $\theta=45°$ and $\varphi=45°$. These last points are important because they means that, actually in a very similar way to the idealised antenna radiation pattern described above with reference to FIG. 5 and FIG. 6, in the antenna radiation pattern of the more realistic antenna depicted in FIG. 7 and FIG. 8, the antenna is again directing energy upwards mostly within an angle range (the 3 dB beamwidth is 0° to 60° with max gain at 45°) that focuses energy in the general direction required to read vehicle license plates.

The fact that the antenna's radiation pattern has a null in the plane of Y=0 (and given that the radiation pattern of the antennas on RFID tags on plates will point forward, not downward) means that the RFID reader associated with the antenna may not be able to read a RFID tag on a vehicle's license plate when/while the tag/license plate is located directly (or almost directly) over the top of the reader, or if it to the side of the antenna in (or near) the plane of Y=0. However, this is not thought to be a major problem because vehicles will rarely (if ever) approach the antenna from directly to the side of the antenna (i.e. vehicles will rarely (if ever) approach the antenna from a direction that would cause the RFID tag on the vehicle's license plate two travel within (or close to) the plane of Y=0 as it nears the antenna). Rather, in the kinds of vehicle parking and gating applications in which this embodiment of the invention is to be used, the antenna will be oriented with its long axis (i.e. the long sides of the ground plane) parallel to the direction in which vehicles will travel as they approach or passed by/over the antenna, and as mentioned above, it is also the case in these kinds of applications that the vehicles will approach the antenna in a direction, and within a range of lateral locations relative to the antenna, that is known/predictable with fairly high confidence. Accordingly, vehicles will generally approach the antenna (and hence the RFID tags on vehicle number plates will approach the antenna) "end-on" (i.e. approximately in or parallel to the plane of X=0), meaning that, even if the plate's RFID tag does become positioned (or passes) directly above the antenna in or about the plane of Y=0, nevertheless to get there the tag will pass (or it will have passed) through one of the lobes of the antenna's radiation pattern, and it will have remained there in for sufficient time to be read (due to the low speed of vehicle movement).

Turning next to FIG. 9 and FIG. 10, these both illustrate schematically the configuration of an RFID reader, wherein the antenna incorporated in the RFID reader and which the RFID reader uses for RFID communication with RFID tags mounted on vehicle license plates, is the particular embodiment of the antenna described above, including with reference to FIG. 3. FIG. 9 and FIG. 10 both show, in particular (in addition to the antenna itself) the surrounding and supporting structure which the RFID reader has/provides for surrounding and supporting the antenna.

There are a number of slight differences between FIG. 9 and FIG. 10 in terms of what these respective Figures show. However, this is not intended to indicate that these two figures show different RFID readers, or different embodiments, from one another. Rather, the two figures relate basically to the same embodiment of an RFID reader, but there are just a few differences between the two Figures in terms of what they show. For instance, the slots 27 and 28 in the respective sides 22 and 24 of the antenna's top radiator are clearly shown in FIG. 9, but they are not visible in FIG. 10. This is not intended to suggest that the antenna in the RFID reader in FIG. 10 does not have the slots 27 and 28. It definitely does; it's just that the slots 27 and 28 are not depicted in FIG. 10. Similarly, in FIG. 10, a small box 73 is visible on one side of the antenna's top radiator. This small box 73 represents an electronic component, or a housing containing electronic components (possibly light-emitting electronic components), or it might alternatively be considered to represent an additional antenna used for wireless (e.g. Bluetooth) communication between the RFID reader and some other computer or mobile device, etc. The component 73, whatever it is, may be positioned in the RFID reader at the location shown in FIG. 10. There could also be a similar, or some other, electronic component located at essentially the same location but on the other side of the antenna in the RFID reader. The component 73 is not shown in FIG. 9; and nor is any other electronic component that might be mounted in the same location but on the other side of the antenna. However, again, this is not intended to suggest that the antenna in the RFID reader in FIG. 9 does not include this/these electronic component(s). It does; it's just that this is not depicted in FIG. 9.

Another difference between FIG. 9 and FIG. 10 is that in FIG. 9 the dimensions of the antenna, and also of portions of the RFID reader's supporting structure, are given in terms of (i.e. as a function of) signal wavelength ($\lambda_0$), whereas in FIG. 10 dimensions are given in millimeters. Note that the particular dimensions given in FIG. 10 are applicable to an antenna/RFID reader that operates at a frequency of about 900-940 MHz.

When the RFID reader shown in FIG. 9 and FIG. 10 is installed on the road (not shown), the antenna's ground plane 10 becomes positioned on the upper surface of the road such that the antenna's top radiator 20 is on the opposite side of the of the ground plane 10 from the road surface. In other words, the underside of the antenna's ground plane component/portion 10 sits face down on the road surface, or possibly face down on one or more thin intermediate layers, e.g. an adhesive layer for securing the RFID reader to the road and/or maybe some other thin intermediate shielding or other layer(s), and the antenna's top radiator 20 sits on top of (and projects upward from) the upper side of the antenna's ground plane 10.

FIG. 9 and FIG. 10 also show that the RFID reader incorporates a number of rigid portions with sloped upper surfaces. In the particular embodiment in FIG. 9 and FIG. 10, included among the RFID reader's rigid portions are a sloped rigid portion on either side of the RFID reader, each along a respective long side/edge of the antenna—one of these is marked 80 and the other 90—and in this particular embodiment both of the said rigid portions 80 and 90 might themselves be said to include three sections. For the rigid portion 80 on one side of the antenna, the three sections thereof include a first section 82, a second section 84 and a middle section 86 which is interposed between the first section 82 and second section 84. Likewise, for the rigid portion 90 on the other side of the antenna, the three sections thereof include a first section 92, a second section 94 and a middle section 96 interposed in the first section 92 and second section 94.

Note that, for the rigid portions 80 and 90, whilst these are described as each including three sections, this is not intended to imply that in each (or either) case the three sections are necessarily independent or separate or separately formed from the other sections. Of course, it is possible that there could be in some embodiments where they are. However, it is thought that more often the respective sections of each rigid portion 80 and 90 will be integrally formed with one another (i.e. together, as one part), and in fact the rigid portions 80 and 90 may (and often will) themselves be integrally formed together with others of the RFID reader's rigid portions—see below. Therefore, the reason why each of the rigid portions 80 and 90 is described here as including three sections is simply because, due to the respective shapes of the rigid portions 80 and 90 in this embodiment, this is simply the most logical and easiest way to describe them. However, there may well be other embodiments where, for example, the overall shape of a rigid portion equivalent to 80 or 90 (or both) is smooth and therefore lacking any edges that notionally divide it into differently-shaped sections. Thus, the specific shape of the sections 82, 84, 86 and 92, 94, 96 in FIG. 9 and FIG. 10, and even the fact that there are separate sections, is not crucial (and similar functionality may be achieved using somewhat different shape(s)). The reason the respective rigid portions 80 and 90 are described this way is, basically, for convenience in describing their particular configuration, and the shape and location of their various sections, in the particular embodiment depicted in FIG. 9 and FIG. 10.

Each of the rigid portions 80 and 90, and each of the respective sections thereof, has an outer perimeter edge. In all cases, this outer perimeter edge lies in the plane of the antenna's ground plane 10. Thus, when the RFID reader is installed, the respective outer perimeter edges of the rigid portions 80 and 90 (and their various sections) sit directly on the surface of the road (just like the antenna's ground plane 10). In many embodiments, most (and perhaps all) of the rigid portions in the RFID reader will be substantially solid. In other embodiments though, one or some of the rigid portions may be somewhat hollow (i.e. having a space or opening inside, for example to house electronic components like the electronic component 73, or the like). However, in all cases, all of the RFID reader's rigid portions will have an unbroken upper surface. (Therefore, even if there are some rigid portions of the RFID reader that have an opening or hollow inside, the said hollow or opening inside that/those rigid portion(s) will be covered up by the rigid portion(s) unbroken upper surface.)

For all of the rigid portions, the upper surface slopes upward from the outer perimeter edge toward the antenna's top radiator 20. More specifically, for the respective middle sections 86 and 96 on either side of the antenna, the outer perimeter edge of each of these lies on the road parallel to the outer edge of the antenna. Therefore, moving from the outside in, the upper surface of each of the respective middle sections 86 and 96 begins at its outer perimeter edge (which lies on the road) and slopes upward such that the inner side thereof meets the antenna's top radiator at the top outer edge of radiator 20. For the respective first sections 82 and 92, and second sections 84 and 94, the outer perimeter edges of these all lie (in the plane of the ground plane 10) at an angle to the side edge of the antenna. More specifically, the outer perimeter edges of the first and second sections all lie directly on the surface of the road, but each of these outer perimeter edges extends from (at one end) one of the corners of the antenna's ground plane 10 to connect (at the other end thereof) with one of the ends of the outer perimeter edge of the relevant middle section 86 or 96. Accordingly, the "planform" or "footprint" shape of each respective first section 82 and 92 and second section 84 and 94 is a right angled triangular, with the outer perimeter edge of each said triangle forming the hypotenuse. In all four of these first and second sections, the upper surface thereof (again) slopes upward from the outer perimeter edge (the hypotenuse of the triangular footprint) towards the antenna's top radiator 20. And in fact, on all of the first and second sections, the upper surface also forms a right angled triangle, again with the outer perimeter edge (which is on the ground/road) forming the hypotenuse, but with the right angled corner this time (for each of them) meeting at a respective top corner of the antenna's top radiator 20. Thus, for both of the rigid portions 80 and 90, the upper surfaces of the respective three sections that make up each of these all slope upward from ground/road level and they all meet at their respective highest points at the level of (and in contact with) the top of the antenna's top radiator 20. Also in this, the upper surfaces of all of the sections on both of the rigid portions 80 and 90 are planar. Therefore, they do not curve or change slope (i.e. the angle of inclination remains fixed) as they extend up from ground level to meet at the level of the antenna's top radiator.

As has been explained, the RFID reader in FIG. 9 and FIG. 10 has as a rigid portion 80 on one side of the antenna and also a rigid portion 90 on the opposite side. The rigid portion 90 is essentially a mirror image of the rigid portion 80, unless perhaps one contains hollows or openings inside it which the other does not, or which are different to the other, etc. However, these rigid portions 80 and 90 are not the only rigid portions in this embodiment of the RFID reader. In addition to these, the RFID reader also incorporates two further rigid portions, namely rigid portions 102 and 104—see the dashed lines in FIG. 10. (Note that the dashed lines in FIG. 10 are not edges or markings that are actually visible on the RFID reader in reality. Rather the dashed lines are included on FIG. 10 simply to assist in visualising the shape and location of the rigid portions 102 and 104. As the dashed lines in FIG. 10 help to illustrate, the outer perimeter edge of the rigid portion 102 runs along (i.e. it meets or sits directly on top of) the end-edge of the antenna's ground plane 10 at one end of the ground plane, and it extends across the full width of the ground plane 10. Likewise, the outer perimeter edge of the rigid portion 104 runs along (i.e. it meets or sits directly on top of) the end-edge of the antenna's ground plane 10 at the other end of the ground plane, and it too extends across the full width of the ground plane 10. And, like the other rigid portions 80 and 90, the rigid portions 102 and 104 are both solid, or perhaps one or both of them may have a hollow or opening inside, but nevertheless both have an unbroken upper surface, and the upper surfaces of the respective rigid portions 102 and 104 slope from their respective outer edges (both on or just above a respective end-edge of the ground plane 10) inward and upward such that the inner sides/edges of the respective rigid portions 102 and 104 meet the long side edges at the top of the antenna's top radiator 20. In other words, the inner side/edge of the rigid portion 102 meets the top radiator at the junction between the sidewall 22 and the joining portion 26 of the top radiator 20. Similarly, the inner side/edge of the rigid portion 104 meets top radiator at the junction between the sidewall 24 and the joining portion 26 of the top radiator 20.

Thus, all portions/areas of the antenna's ground plane 10 which are located forward and aft of the top radiator 20 in the antenna's longitudinal/lengthwise direction are beneath and therefore covered by the rigid portions 102 and 104. These portions or areas of the ground plane 10 are therefore be protected (e.g. from physical damage or exposure to the elements, etc) by the rigid portion 102 and 104. Also, the rigid portions 80 and 90 also protect the sides of the antenna. Furthermore, as mentioned above, in many embodiments, the rigid portions 80 and 90 and also the rigid portions 102 and 104 may be intimately formed together as one piece. Thus, the antenna's ground plane 10, the antenna's top radiator 20, and in the other components of the antenna, plus also any electronic components that are included in or form part of the RFID reader, are (in this embodiment anyway) effectively embedded beneath and within the integral combined rigid portions, which survey protective and structurally supported function, as discussed below.

It was mentioned in passing above that the rigid portions 102 and 104 effectively cover the portions of the ground plane 10 that are forward and aft of the top radiator 20, thereby protecting these portions of the ground plane 10 from e.g. physical damage, damage through exposure to the elements, except. It was also mentioned in passing that the rigid portions 80 and 90 provide similar protection for the antenna from the sides. In addition to this though, in this particular embodiment, rigid portions of the RFID reader are actually also responsible for providing the physical supporting structure for the RFID reader's antenna, as well as any other electronic components and the like that may be contained in or form part of the RFID reader. The way in which the rigid portions provide the RFID reader's physical structure can be understood quite simply. Consider the components of the antenna. As mentioned elsewhere, the components of the antenna, especially the top radiator 20, will often be made from thin metal, perhaps only a few millimeters or possibly even less than a millimeter in thickness. The top radiator 20 is also elevated relative to (i.e. it is located vertically above) the antenna's ground plane 10 when the reader is installed on the road. Naturally, thin metal such as this, especially if elevated/upstanding and unsupported in "free space", would be very flexibly and flimsy. It should also be recognised that, by virtue of its location on a road surface, the RFID reader may often be directly run over by vehicles. Clearly therefore, it is essential for the RFID reader (including its antenna structure) to be able to withstand such forces and impacts repeatedly and over a long period of time without damage or affect on the reader's/antenna's functioning or performance. It is therefore also clear there needs to be something to prevent any otherwise thin/flimsy pieces of metal that make up or are comprised in the RFID reader or its antenna (in particular the radiating component) from simply being crushed/flattened and completely destroyed by such vehicle impacts. It is this function that the rigid portions provide. In other words, as mentioned above, the components of the antenna are effectively embedded beneath and within the integrally combined rigid portions, and as a result, not only are the components of the antenna protected from damage when vehicles drive over the RFID reader by the rigid portions which are themselves able to withstand this (meaning that the antenna components which are safely housed within are also protected from damage), but the components of the antenna are also themselves supported within the rigid portions (i.e. held in position and prevented from deforming or separating or warping or the like).

The various slopes or angles of inclination of each rigid portion (and of the various different sections thereof) should be quite gentle (i.e. not steep), and it will now be recognised that the reason why this important is to allow vehicle wheels/tires to easily roll over the RFID reader (i.e. directly over the top of the whole RFID reader, or over a portion of the RFID reader), without causing a large or dangerous pump or jolt to the vehicle. However, ensuring that the angles of inclination of the respective rigid portions (and the various sections thereof) are gentle may also help to at least a somewhat reduce the risk or likelihood of a person tripping or stumbling or injuring themselves should they accidentally kick or trip on the RFID reader. For this purpose, it is thought that the slope of the upper surface on any rigid portion of the RFID reader should preferably be no steeper than 45°.

As mentioned above, it is thought to be important that the maximum thickness of the RFID reader in a direction perpendicular to the road (i.e. the maximum height of the RFID reader) should be no more than about 25 mm. This maximum thickness (about 25 mm) is considered to be acceptable, and it is also thought to be also compliant from a standards/regulatory point of view, as this is the same height as (or perhaps it may even be slightly less than) the height of many conventional "cat eyes" and other retroreflective devices commonly used on public roads. The embodiment of the RFID reader shown in FIG. 10, for example, achieves this. Indeed the height of that RFID reader at its highest point (which is in the centre at the top of the top radiator 20) is only 20 mm.

The material from the rigid portions of the RFID reader in FIG. 9 and FIG. 10 are made (and it will be recalled that all of the rigid portions in this RFID reader may, in fact, be integrated formed together) should be physically strong/tough and durable (i.e. so as to be able to withstand repeated impact loading e.g. when vehicles drive over the top, and so as to thereby provide the structural support for parts of the antenna inside, as well as able to withstand prolonged exposure to the sun and other elements, significant temperature fluctuations, etc). The material from the rigid portions are made should also have dielectric properties which do not substantially interfere with the impedance matching and/or radiation performance/characteristics of the antenna, or it may be that the dielectric properties of the material can be used (e.g. by altering the shape of one or more of the rigid portions made from this material) to controllably alter (i.e. tune) the antenna's radiation pattern and/or its radiation performance/characteristics). The material from the rigid portions are formed may also be optically transparent, or at least optically translucent. Suitable material from which the rigid portions of the RFID reader may be made include various types of polycarbonate, polyethersulfane, or like materials. Examples of specific materials that may be suitable include the materials produced by the Röchling group of companies and sold under the names/trade marks SUSTARIN C, SUSTANAT PC and SUSTASON PES. Reasons why it may be beneficial or advantageous for the rigid portions to be made from an optically transparent (or optically translucent) material include: so as to allow for light to be emitted from light emitting components (see below), and to allow for solar panels, which may be mounted on or incorporated into the structure of the RFID reader (and which may be partially or wholly covered or inside the rigid portion material), to receive light/solar radiation from which energy is thereby generated.

The RFID reader may include one or more light emitting components e.g. such as LEDs, lights or the like (illustrated). Such light emitting components may be located or housed in one or both of the open ends of the top radiator 20—such lights may be most visible when the RFID reader is observed (when the lights are illuminated) from the side. Alternatively, or in addition, the RFID reader could includes one or more light-emitting components located within the material of one or both of the rigid portions 80 and 90, which would thereby replace that/those light emitting components outside of the antenna, possibly making them more visible from in front and behind the antenna in the lengthwise/longitudinal direction as well as from the side of the RFID reader. It is thought that positioning light emitting components either within the open ends of the cavity within the top radiator 20, or within the rigid portions 80/90 to the sides of the antenna, should not interfere with the antenna's radiative properties (recall that the majority of the energy radiated by the antenna "comes out" of the slots 27 and 28 in the respective sides of the antenna's top radiator, and therefore extend predominantly in the antenna's lengthwise/longitudinal direction, as depicted and described with reference to FIG. 5 and FIG. 7).

At least some, and possibly most, of the RFID reader's electronics and circuitry may be located within the region of space inside the top radiator 20 (i.e. beneath the radiator's joining portion 26 and between its sidewalls 22 and 24). Note that, at least usually, whilst the regions immediately above the ground plane 10 and also immediately to the sides of the antenna will be filled with the material that forms the rigid portions 80, 90, 102, 104 (see above), nevertheless the region of space inside the top radiator may remain unfilled by this material.

It was mentioned above that the antenna's top radiator 20, and possibly also the ground portion 10, is made from a material (typically metal) having a suitably high electrical conductivity. In addition to this, the material from which at least the top radiator 20 (and preferably also the ground plane 10) is made should also be thermally conductive, so that at least the top radiator 20 can help (as a secondary function) to dissipate heat generated by any RFID reader electronics and circuitry located within the cavity inside the top radiator 20.

The RFID reader may be powered in any suitable way. Options include that the RFID reader is powered by induction loop or by power-supply wires/cables connected to the RFID reader (connected once it has been installed). Alternatively, or in addition thereto, the RFID reader may incorporates one or more solar (photovoltaic) cells. It is possible that, in some embedment's, the solar cells may be operable to produce and supply to the RFID reader enough electrical energy to partly or even fully power the RFID reader (or certain parts or components of the rear, or certain of its functionalities). In the embodiment depicted in FIG. 10, solar cells could be located e.g. on top of the joining portion 26 of the top radiator 20. In this location, the solar cells should not significantly interfere with the antenna's radiative properties, and this may also be a convenient location given the ease with which cables or connectors could then be made to carry electricity generated using the PV cells to the RFID reader's internal circuitry (which is located, at least mostly, within the cavity inside the top radiator 20 and therefore immediately beneath the PV cells).

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An antenna for a communication device, the antenna having a structure comprising:
    an electrically conductive ground portion, and
    an electrically conductive radiating component,
        the radiating component having a first side, and a second side that is spaced apart from the first side, and
        the first side has a ground edge portion which is in contact with the ground portion, and the first side extends, from its ground edge portion, away from a surface on one side of the ground portion;
        the second side also has a ground edge portion which is in contact with the ground portion, and the second side also extends, from its ground edge portion, away from a surface on said one side of the ground portion; and
        the radiating component also has a joining portion which is spaced apart from the ground portion on said one side of the ground portion, and the joining portion extends between the first side and the second side, such that there is a region of space defined between the first side and the second side and between the joining portion and the ground portion; and
        the first side and the second side each have a slot therein,
    wherein the antenna is fed from the ground portion with a feed pin that extends between and connects the ground portion and the underside of the radiating component's joining portion, and the feed pin is oriented perpendicularly to the ground portion and connects the ground portion to the underside of the joining portion half way along the length of the joining portion and half way between the first side and the second side of the radiating component.

2. The antenna as claimed in claim 1, wherein the region of space defined between the first side and the second side of the radiating component and between the joining portion of the radiating component and the ground portion is open at either end, or wherein the region of space defined between the first side and the second side of the radiating component and between the joining portion of the radiating component and the ground portion is shaped substantially as a rectangular prism or box shape.

3. The antenna as claimed in claim 1, wherein
    the ground portion is substantially planar,
    the first side and the second side of the radiating component are both substantially planar and rectangular and both are oriented with their planes substantially perpendicular to the plane of the ground portion,
    on both the first side and second side of the radiating component:
        the ground edge portion which is in contact with the ground portion forms one of the longer edges of the side's rectangular shape;
        there is a distal edge portion, opposite the ground edge portion, which forms the other of the longer edges of the side's rectangular shape, and
    the joining portion of the radiating component is substantially unbroken, planar and rectangular and it extends between the distal edge portions of the first side and the second side along the full length of the radiating component.

4. The antenna as claimed in claim 3, wherein ground portion is substantially planar, such that it is a ground plane, and the ground plane is rectangular with a length dimension and a width dimension, the length dimension being greater than the width dimension, and the radiating component has a length which extends substantially across the width of the ground plane.

5. The antenna as claimed in claim 4, wherein the length of the ground plane is about $\lambda_0$, where $\lambda_0$ is the free space wavelength of the center frequency of the antenna's operating signal, and one or more of the following apply:
   the width of the ground plane is about $0.55\lambda_0$ or greater; and optionally the length of the ground plane can also be reduced to less than $\lambda_0$ through or as part of antenna tuning;
   the length of the slot in each of the first side and the second side is about $0.5\lambda_0$;
   the joining portion of the radiating component is spaced apart from the ground plane by about $0.06\lambda_0$; or
   the first side and the second side of the radiating component are spaced apart by about $0.2\lambda_0$.

6. The antenna as claimed in claim 1, wherein the slots in the sides of the radiating component extend approximately parallel to the sides' ground edge portions, or wherein the slots in the sides of the radiating component extend for almost the full length of the sides' ground edge portion.

7. The antenna as claimed in claim 1, wherein
   the antenna's ground portion and radiating component are both made from a metal or metal-based material, or
   the antenna's radiating component is made from thin, electrically conductive wires which are arranged such that, together, they define the shape of the antenna's radiating component, and open spaces remain between the wires such that the antenna's radiating component (at least) is substantially optically transparent.

8. The antenna as claimed in claim 1, wherein the radiation pattern of the antenna is substantially bi-directional in the azimuth plane, and the radiation pattern shape has, for each of the two directions, one or more round or bulbous "lobe" shaped portions each of which generally points away from the radiating component in a lengthwise direction of the antenna, and wherein at least the majority of each "lobe" shape is located at an angle of between 0° and 90° elevation above the ground portion.

9. The antenna as claimed in claim 8 wherein, within a plane that is perpendicular to the antenna's ground portion but aligned with the lengthwise centerline axis of the ground plane, the 3 dB beam width of the antenna's radiation pattern is contained within the angle range of between about 30° and about 65° elevation above the ground portion.

10. An RFID reader capable of installation on a road or ground or floor surface, wherein an antenna incorporated in the RFID reader and which is used by the RFID reader for RFID communication is an antenna as claimed in claim 1.

11. The RFID reader as claimed in claim 10 further incorporating one or more rigid portions with (a) sloped upper surface(s), wherein:
   the slope of the upper surface of each rigid portion begins at the level of the antenna's ground portion;
   each rigid portion slopes generally upward toward the antenna's radiating component, and
   the sloping upper surface of each rigid portion meets the antenna's radiating component at about the level of the joining portion of the antenna's radiating component.

12. The RFID reader as claimed in claim 10 wherein, if or when the RFID reader is installed on the road or ground or floor surface, the maximum thickness of the RFID reader in a direction perpendicular to the road or ground or floor surface is no more than about 25 mm.

13. The RFID reader as claimed in claim 12, wherein the RFID reader has more than one rigid portion, and:
   at least one said rigid portion is initially formed separately from at least one other said rigid portion and these are subsequently brought or assembled together along with any other rigid portion(s), the antenna, and any other parts or components, when the RFID reader is formed/assembled, or
   the material from which at least one of the rigid portions is formed is physically strong/tough and durable, and/or the material has dielectric properties which do not substantially interfere with the impedance matching and/or radiation performance/characteristics of the antenna or the dielectric properties of the material can be used to controllably alter the antenna's radiation pattern and/or its radiation performance/characteristics, or
   the material from which at least one of the rigid portions is formed is optically transparent, or at least optically translucent, in which case, optionally, the region of space defined between the first side and the second side of the antenna's radiating component and between the joining portion of the antenna's radiating component and the antenna's ground portion is open at either end and the RFID reader includes one or more light emitting components located or housed in one or both of the said ends or elsewhere within the material of one or more of the rigid portions, or
   the material from which at least one of the rigid portions is formed is a type of polycarbonate or Polyethersulfane.

14. The RFID reader as claimed in claim 10, wherein at least some of the RFID reader's electronics and circuitry are located within the region of space defined between the first side and the second side of the antenna's radiating component and between the joining portion of the antenna's radiating component and the antenna's ground portion.

15. The RFID reader as claimed claim 10, wherein the RFID reader:
   is capable not only of RFID communication using the antenna (the main antenna), but also of separate wireless communication with one or more other electronic devices, in which case the RFID reader optionally incorporates a secondary antenna, and the secondary antenna facilitates said separate wireless communication with other electronic devices, or
   incorporates one or more solar cells, which is/are operable to produce and supply to the RFID reader enough electrical energy to partly or fully power the RFID reader, in which case the one or more solar cells are optionally located on top of the joining portion of the radiating component of the RFID reader's (main) antenna, and further optionally the radiating component of the RFID reader's (main) antenna is made from thin, electrically conductive wires which are arranged such that, together, they define the shape of the antenna's radiating component and open spaces remain between the wires such that the antenna's radiating component (at least) is substantially optically transparent and the solar cells are mounted at the level of, or directly on, or they form, the antenna's ground portion.

16. The antenna as claimed in claim 10 wherein:
   there is a rigid portion beginning at each of the end edges of the antenna's ground portion, and the said rigid portions slope up from the respective end edges to meet the antenna's radiating component at the level of the radiating component's joining portion, such that portions or areas of the antenna's ground portion, on either side of the antenna's radiating component, which are located between the antenna's radiating component and the respective end edges of the antenna's ground portion are beneath the rigid portions, or there is at least one rigid portion beginning out beyond the side edges of the antenna's ground portion on both sides of the ground portion, and the said rigid portions slope up from there to meet the antenna's radiating component at the level of the radiating component's joining portion, or the slope of the upper surface on any rigid portion of the RFID reader is no steeper than 45°.

* * * * *